(12) United States Patent
Majd et al.

(10) Patent No.: US 12,062,916 B2
(45) Date of Patent: Aug. 13, 2024

(54) SYSTEMS AND METHODS FOR FACILITATING MEDIUM VOLTAGE MICROGRID OPERATION TO MANAGE CRITICAL LOADS

(71) Applicant: BLOOM ENERGY CORPORATION, San Jose, CA (US)

(72) Inventors: Afshin Majd, San Jose, CA (US);
Prasad Pmsvvsv, San Jose, CA (US);
Carlton Cottuli, San Jose, CA (US);
Chad Pearson, San Jose, CA (US);
Daniel Baynes, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/509,069

(22) Filed: Nov. 14, 2023

(65) Prior Publication Data

US 2024/0170969 A1     May 23, 2024

Related U.S. Application Data

(60) Provisional application No. 63/383,751, filed on Nov. 15, 2022.

(51) Int. Cl.
*H02J 3/38* (2006.01)
*H01M 8/04302* (2016.01)
(Continued)

(52) U.S. Cl.
CPC .......... *H02J 3/38* (2013.01); *H01M 8/04302* (2016.02); *H01M 8/04656* (2013.01);
(Continued)

(58) Field of Classification Search
CPC .... H02J 3/38; H02J 3/00; H02J 3/0075; H02J 2300/30; H01M 8/04302; H01M 8/04656;
(Continued)

(56) References Cited

U.S. PATENT DOCUMENTS

2022/0121260 A1    4/2022 King et al.

FOREIGN PATENT DOCUMENTS

AU      2013296439 B2    7/2014

OTHER PUBLICATIONS

Smart Grid—The New and Improved Power Grid: A Survey, IEEE Communications Surveys & Tutorials, Xi Fang, Satyajayant Misra, Guoliang Xue, Dejun Yang, vol. 14, No. 4, 2012.

*Primary Examiner* — Robert L Deberadinis
(74) *Attorney, Agent, or Firm* — Evergreen Valley Law Group; Kanika Radhakrishnan

(57) ABSTRACT

Systems and methods for facilitating a medium voltage microgrid operation to manage critical loads are disclosed. The system includes at least two fuel cell systems that operate in one of at least two operating modes including a grid-forming mode and a grid-following mode, based on an operation of at least two utility feeders of a grid. The system includes a controller that receives values corresponding to electrical parameter(s) from at least two utility circuit breakers and a load circuit breaker, detects availability status of the utility circuit breakers to supply power to corresponding at least two portions of the critical load, and a connection status of the load circuit breaker, based on the values, and facilitates the at least two fuel cell systems to operate in one of the at least two operating modes. Further, the system is scalable, redundant, and reliable, and reliability and redundancy are customizable.

20 Claims, 11 Drawing Sheets

(51) Int. Cl.
*H01M 8/04537* (2016.01)
*H01M 8/04694* (2016.01)
*H02J 3/00* (2006.01)

(52) U.S. Cl.
CPC ....... *H01M 8/04694* (2013.01); *H02J 3/0075* (2020.01); *H01M 2250/10* (2013.01); *H02J 2300/30* (2020.01)

(58) Field of Classification Search
CPC ......... H01M 8/04694; H01M 2250/10; H01M 8/04537
See application file for complete search history.

SYSTEMS AND METHODS FOR FACILITATING MEDIUM VOLTAGE MICROGRID OPERATION TO MANAGE CRITICAL LOADS

TECHNICAL FIELD

The present invention relates to the field of power systems and, more particularly, to systems and methods for facilitating medium voltage microgrid operation to manage critical loads. More specifically, the present invention relates to systems and methods for controlling operating modes of fuel cell systems connected to a critical load.

BACKGROUND

An electric grid can include a network of electric power generators, such as power stations, and user loads that are connected by transmission and distribution lines and are operated by one or more control centers. Electric grids supply electric power from power stations to user loads for their normal functioning. However, electric grids may experience operational failures because of damage to electrical systems due to extreme weather conditions or other reasons. In addition, electric grids can intermittently fail as a consequence of maintenance, time-worn power lines, cyber-attacks, and the like. As a result, electric grids face supply-and-demand incongruences and various alternative power supply solutions have been proposed to address the above-mentioned issues. Alternative power supply solutions include smart grid solutions, electricity accumulation, renewable energy integration, energy decentralization, microgrid, uninterrupted power supplies (UPS), generators, and the like.

Many organizations are dependent on data and voice processing systems which have become a fundamental part of everyday infrastructure. Consequently, a complete or even a partial power failure can have adverse consequences. Further, for critical loads that require a continuous supply of power, such as data center servers, life support systems, etc., even a few seconds of a power disruption at such critical loads could lead to significant revenue loss for most of the organizations and even worse, it could jeopardize the safety of employees, customers, and/or patients. Thus, for long-term and/or short-term utility outages, such critical loads can switch to the above-mentioned alternative power supply solutions. In some approaches, existing configurations may be adopted to facilitate efficient switching between grid and the alternative power supply solutions with the loads. However, such existing configurations or arrangements and/or alternative power solutions have limitations in terms of the amount of power that they can supply which is far less than the conventional grid, and rigid in terms of varying the amount of power that they can supply. In addition, the continuity needed to supply power to the critical loads is unpromising, thereby making such configurations less efficient and less reliable.

Hence, there exists a technological need for improved systems and methods for facilitating medium voltage microgrid operation to manage critical loads. More specifically, there is a need for systems and methods for controlling a configuration of microgrids associated with a critical load.

SUMMARY

Various embodiments of the present disclosure provide systems and methods for facilitating medium voltage microgrid operation to manage critical loads.

In an embodiment, a system is disclosed that includes at least two fuel cell systems including a first fuel cell system and a second fuel cell system. Each of the at least two fuel cell systems is configured to operate in one of at least two operating modes based on an operation of each of at least two utility feeders of a grid connected to the corresponding at least two fuel cell systems. The at least two operating modes include a grid-forming mode and a grid-following mode. Each of the at least two utility feeders is configured to supply power to a corresponding portion of at least two portions of a critical load through corresponding at least two utility circuit breakers. The at least two utility feeders include a first utility feeder and a second utility feeder. The at least two portions of the critical load include a first portion and a second portion. The at least two portions of the critical load are connected through a load circuit breaker. The load circuit breaker is configured to control a flow of power through the at least two portions of the critical load. The system also includes a controller electronically coupled to each of the at least two fuel cell systems. The controller is configured to receive a plurality of values corresponding to one or more electrical parameters from the at least two utility circuit breakers and the load circuit breaker. The controller is further configured to detect an availability status of each of the first utility feeder and the second utility feeder to supply power to the first portion and the second portion of the critical load respectively, based at least on the plurality of values. The controller is also configured to detect a connection status associated with the load circuit breaker positioned between the first portion and the second portion of the critical load, based at least on the plurality of values. Further, the controller is configured to facilitate each of the first fuel cell system and the second fuel cell system to operate in one of the at least two operating modes in response to at least one of the availability status of each of the first utility feeder and the second utility feeder, and the connection status associated with the load circuit breaker.

In another embodiment, a system is disclosed that includes at least two utility circuit breakers. Each of the at least two circuit breakers is configured to control a flow of power from each of at least two utility feeders of a grid to corresponding at least two portions of a data center load. The at least two utility feeders include a first utility feeder and a second utility feeder. The at least two portions include a first portion and a second portion. The system further includes a load circuit breaker positioned between the at least two portions of the data center load. The load circuit breaker is configured to control a flow of power through the at least two portions of the data center load. The first utility feeder and the first portion of the data center load are connected to a first fuel cell system. The first fuel cell system is configured to operate in one of at least two operating modes based on an operation of each of the at least two utility feeders of the grid. The second utility feeder and the second portion of the data center load are connected to a second fuel cell system. The second fuel cell system is configured to operate in one of the at least two operating modes based on the operation of each of the at least two utility feeders of the grid. The at least two operating modes include a grid-forming mode and a grid-following mode. The system further includes a controller electronically coupled to the at least two utility circuit breakers and the load circuit breaker. The controller is configured to receive a plurality of values corresponding to one or more electrical parameters from the at least two utility circuit breakers and the load circuit breaker. The controller is further configured to detect an availability status of each of the first utility feeder and the second utility feeder to supply power to the first portion and the second portion of the data center load respectively, based at least on the plurality of values. The controller is also configured to detect a connection status associated with the load circuit breaker positioned between the first portion and the second portion of the data center load, based at least on the plurality of values. Furthermore, the controller is configured to facilitate each of the first fuel cell system and the second fuel cell system to operate in one of the at least two operating modes in response to the at least one the availability status of each of the first utility feeder and the second utility feeder, and the connection status associated with the load circuit breaker.

In yet another embodiment, a method is disclosed that includes receiving a plurality of values corresponding to one or more electrical parameters from at least two utility circuit breakers positioned between at least two utility feeders and corresponding at least two portions of a critical load respectively, and a load circuit breaker positioned between the at least two portions of the critical load. The method further includes detecting an availability status of each of the at least two utility circuit breakers to supply power to the corresponding at least two portions of the critical load respectively, based at least on the plurality of values. The method also includes detecting a connection status associated with the load circuit breaker positioned between the at least two portions of the critical load based at least on the plurality of values. The method further includes facilitating each of at least two fuel cell systems to operate in one of at least two operating modes in response to at least one of the availability status of each of the at least two utility feeders, and the connection status associated with the load circuit breaker. The at least two operating modes include a grid-forming mode and a grid-following mode.

BRIEF DESCRIPTION OF THE FIGURES

For a more complete understanding of example embodiments of the present technology, reference is now made to the following descriptions taken in connection with the accompanying drawings in which.

Figure 1:
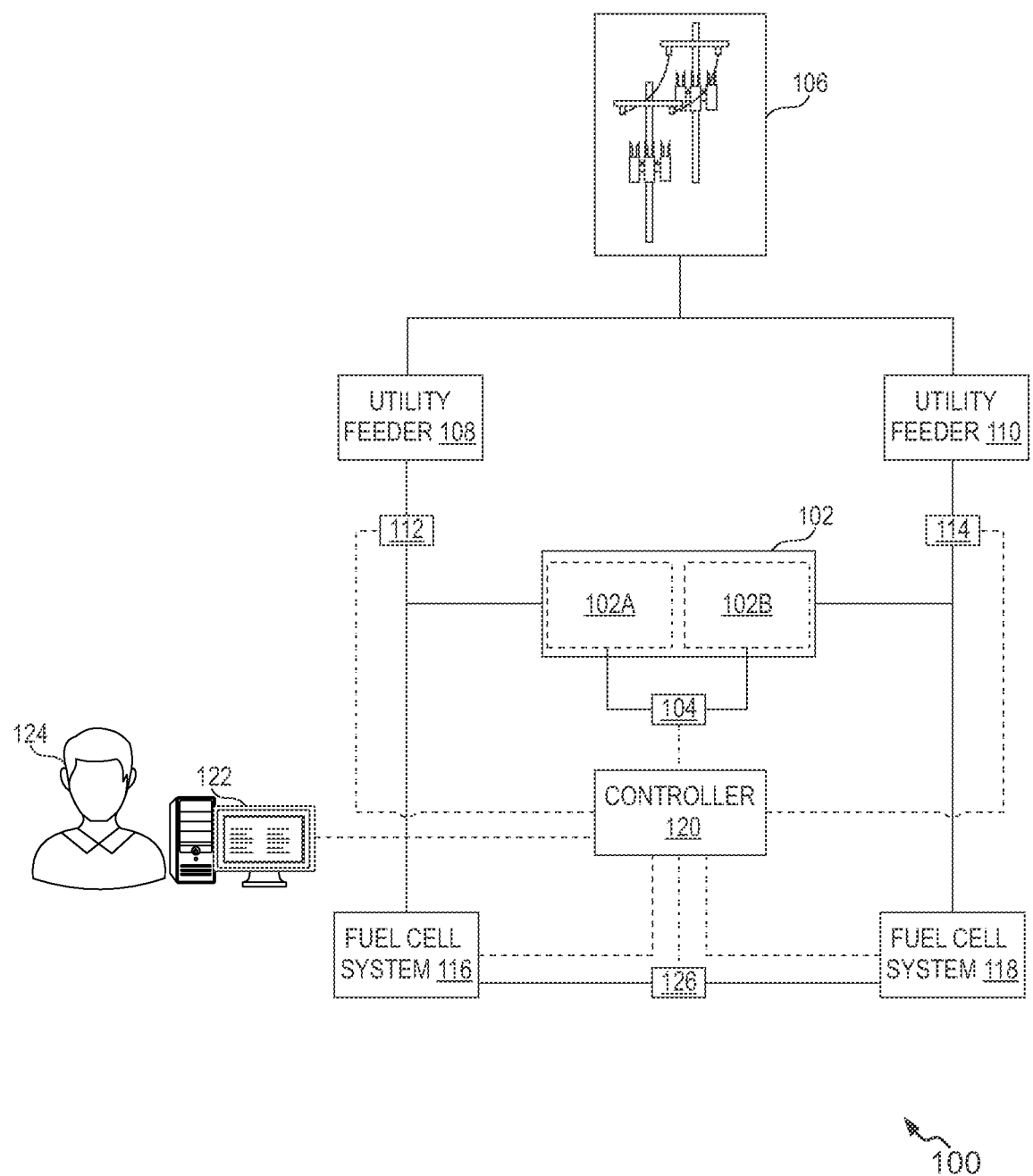
FIG. 1 is a schematic illustrating an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms "grid", "public grid", "electrical grid", "main grid", "power grid", "electrical power grid", and "utility" are generally used interchangeably throughout the description, and they refer to an interconnected network of one or more components for electricity delivery from producers such as power stations to user loads. The components may include energy sources, electric substations, electrical power transmission systems, electrical power distribution systems, and the like. The grid may vary in size and can cover large areas such as one or more cities or states.

The term "microgrid" refers to a local electrical grid with defined boundaries, acting as a single and controllable entity that is usually attached to a main grid but is also able to function independently.

The terms "utility feeder" and "feeder line" may be used interchangeably throughout the description, and they refer to a type of transmission line that transmits power from a generating station or substation to distribution points.

The term "inverter" refers to an electronic device that converts Direct Current (DC) power to Alternating Current (AC) power.

The terms "load", "electric load", and "user load" may have been used interchangeably throughout the description, and they refer to any component of a circuit that consumes power or energy.

The term "critical load" is generally used throughout the description, and it refers to a load that requires a continuous supply of power and even a few seconds of power disruption can lead to a huge amount of loss to organizations that rely on the continuous operation of the critical load.

The term "fuel cell system" refers to a system containing one or more electrochemical cells that convert the chemical energy of a fuel (often hydrogen) and an oxidizing agent (often oxygen) into electricity through a pair of redox reactions. The fuel cell system may contain a stack of multiple fuel cells. The different types of fuel cells developed in the market include phosphoric acid fuel cells (PAFC), proton exchange membrane fuel cells (PEM), alkaline fuel cells (AFC), solid oxide fuel cells (SOFC), and the like. Applications for fuel cells include backup power generation, fuel cell electric vehicles, distributed generation, and the like.

The terms "stamp", and "power stamp" may be used interchangeably throughout the description, and they refer to a group of power sources located in a particular geographical area, collectively responsible for generating a predetermined power rating.

The term "grid-following mode" and "grid parallel mode" may be used interchangeably throughout the description and they refer to a mode of operation of an inverter receiving power from a Distributed Energy Resource (DER) (e.g., a fuel cell system), in which the inverter tracks a voltage angle of the grid or the microgrid to control an output (synchronizing to the grid or the microgrid) of the inverter.

The term "grid-forming mode", "grid isolation model", "island mode", "islanding mode", "stand-alone mode", and "standby mode" may be used interchangeably throughout the description and may refer to a mode of operation of an inverter receiving power from a DER (e.g., a fuel cell system), in which the inverter actively controls the frequency and voltage output of the inverter independent of the grid.

The term "black start" refers to the ability of generators to restart parts of the power system to recover from a blackout. This entails isolated power stations being started individually and gradually reconnected to one another to form an interconnected system again. More specifically, the black start of a microgrid is followed by the islanding mode operation.

Overview

Various example embodiments of the present disclosure provide systems and methods for facilitating a medium voltage (MV) microgrid operation to manage critical loads. More specifically, the present disclosure provides systems and methods for controlling one or more operating modes of one or more fuel cell systems connected to a critical load. The majority of the loads and especially critical loads run on a supply of power from a public grid. However, when the critical loads are receiving power only from the public grid, there is a possibility of power cuts based on multiple factors. Thus, to avoid an adverse situation arising from power cuts, the critical loads need to have an option to receive power from alternative power sources.

Therefore, the present disclosure provides a power source, such as a solid oxide fuel cell (SOFC) system, connected to the critical load and the public grid. The connection is accomplished in such a way that the critical load can either operate on the power received from the public grid, the SOFC system, or both based on operational requirements of the critical load and/or instructions received from a user operating the critical load. Accordingly, various embodiments of the present disclosure provide a solution to reduce the dependency of the critical load on the public grid.

In an embodiment, two SOFC systems may be connected to the critical load forming two microgrids that are also connected to two utility feeders of the public grid. In some forms, the critical load may also be divided into two portions when the power from one of the two SOFC systems is insufficient to supply the entire demand of the critical load. The two SOFC systems are connected to the two portions of the critical load independently. Further, the two utility feeders are also connected to the two portions of the load independently, and also to the corresponding two SOFC systems. More specifically, in an example, the critical load is divided into two portions, with each portion receiving power from a corresponding utility feeder of the two utility feeders during a normal operation. Moreover, each portion of the critical load corresponds to a half portion of the critical load, and hence each utility feeder can feed power to only respective half portions of the critical load. The two SOFC systems may either work as two separate units or a connected unit based on a status of an electrical interlocking device positioned between the two SOFC systems. Each of the two SOFC systems may operate in one of at least two operating modes such as a grid-forming mode or a grid-following mode based on the availability or unavailability of the power from the public grid connected to the critical load. Moreover, in an example implementation, the two SOFC systems are capable of replicating the behavior of the public grid in terms of load changes, reliability, and the like.

Without loss of generality, three scenarios are described in the present disclosure based on switching between different configurations of the two microgrids associated with the critical load. The switching between the configurations occurs based on the operating mode in which the SOFC systems can operate. The three scenarios may be as follows:

1. The public grid is not available on both portions of the critical load, or both the utility feeders fail to supply power to the critical load. In this case, each portion of the critical load is served by a SOFC system operating in the grid-forming mode.
2. The public grid is available on both portions of the critical load, or both utility feeders supply power to the critical load. In this case, both SOFC systems connected to the respective utility feeders are working in the grid-following mode. Further, the SOFC systems will disconnect from the utility feeders when the power supplied by the public grid goes out of range.
3. The public grid is available only on one portion of the critical load, or only one of the two utility feeders is supplying power to one of the two portions of the critical load. In this case, the SOFC systems operate differently under the following two scenarios as described below:
   A first scenario is when both the portions of the critical load are disconnected from each other: In this scenario, a SOFC system, on a portion of the critical load that does not receive power from its corresponding utility feeder, will work in the grid-forming mode, whereas the other SOFC system that is on a portion of the critical load that receives power from its corresponding utility feeder, will work in the grid-following mode.

A second scenario is when both portions of the critical load are connected: In this scenario, both the SOFC systems will work in the grid-following mode.

When the SOFC systems switch from the grid-following mode to the grid-forming mode, the SOFC systems go through a black start process. Herein, one or more microgrids associated with the critical load are energized in a predefined sequence. The predefined sequence includes a grid-forming phase followed by a load walk-in phase.

Furthermore, in some embodiments, the present disclosure provides a system including a controller, multiple circuit breakers, and one or more fuel cell systems operating together for providing medium voltage microgrid operation to manage critical loads. As a result, the system controls the operating modes of the fuel cell systems connected to the critical load. For example, the controller may be a microgrid controller. In some embodiments, the system further includes one or more fuel cell controllers associated with the corresponding one or more fuel cell systems respectively. Each of the one or more fuel cell controllers is configured to control an operation of at least one fuel cell based at least on instructions from a user and the controller. The controller receives values corresponding to electrical parameters associated with the multiple circuit breakers for determining whether the critical load is receiving power from the public grid or not. Based on these values, the operating modes of the one or more fuel cell systems are controlled by the controller.

Various embodiments of the present disclosure offer multiple advantages. For instance, the present disclosure provides the systems and methods for facilitating a fuel cell-based medium voltage microgrid operation to manage critical loads or control the configuration of the microgrids. It may be noted that the configuration of the microgrids is controlled by partitioning the critical load based on the power capacity of the fuel cell system connected to the critical load. Further, based on the configuration of the microgrids, the system can also control the operating modes of the fuel cell system connected to the critical load. As a result, the capability of the system to maintain the continuity in the supply of power that is needed for critical loads is more assured than in conventional systems, thereby making the system more efficient and more reliable.

In some embodiments, the present disclosure provides fuel cell systems having a power capacity near to the power of the grid. Considering that, the critical loads can work independently on the fuel cell systems, thereby reducing the dependency and power consumption from the grid. Further, the present disclosure also provides fuel cell systems that can deliver a reliable and scalable solution to power demands of critical loads such as data centers, where they can work in independent or grid-following mode. Such systems are scalable, redundant, and reliable, and the reliability and redundancy are customizable.

FIG. 1 illustrates an environment 100 related to at least some examples of the present disclosure. Although the environment 100 is presented in one arrangement, other embodiments may include the parts of the environment 100 (or other parts) arranged differently depending on, for example, facilitating a medium voltage microgrid operation to manage critical loads or controlling a configuration of one or more microgrids associated with a critical load. The environment 100 illustrated in FIG. 1 depicts a critical load 102 including at least two portions (e.g., the portions 102A and 102B), wherein the portions 102A and 102B are connected with each other through at least one circuit breaker such as a load circuit breaker 104. The environment 100 further includes a grid 106 supplying power to each of the portions 102A and 102B of the critical load 102 through at least two utility feeders (e.g., the utility feeders 108 and 110), respectively. In a non-limiting implementation, the critical load 102 can be split into equal halves 102A and 102B, with each half 102A and 102B receiving power from the corresponding utility feeder of the at least two utility feeders 108 and 110, respectively. The environment 100 further depicts at least two utility circuit breakers (e.g., utility circuit breakers 112 and 114) controlling the supply of power from each of the utility feeders 108 and 110 to the corresponding portions 102A and 102B of the critical load 102, respectively.

The environment 100 also depicts at least two fuel cell systems (e.g., the fuel cell systems 116 and 118) connected to the corresponding utility feeders 108 and 110, respectively. The fuel cell systems 116 and 118 are also connected to the corresponding portions 102A and 102B of the critical load 102, respectively. Further, the fuel cell systems 116 and 118 are configured to supply power to the portions 102A and 102B of the load 102, respectively, in a grid-forming mode or a grid-parallel mode based on the availability of the grid 106. In a non-limiting example, one of the fuel cell systems 116 and 118 may be capable of supplying power to only one-half of the critical load 102 i.e., the fuel cell system 116 to the portion 102A and the fuel cell system 118 to the portion 102B.

Moreover, if the fuel cell system 116 or 118 is supplying power to the corresponding portion 102A or 102B of the critical load 102, respectively, in the presence of the grid 106, the fuel cell system 116 or 118 operates in the grid-parallel mode. Alternatively, it may be understood that the fuel cell system 116 or 118 can be operated in the grid-forming mode. Additionally, the environment 100 further depicts a controller 120 electronically coupled to the load circuit breaker 104, the utility circuit breakers 112 and 114, the fuel cell systems 116 and 118, and a user device 122 associated with a user 124.

In a non-limiting example, the user device 122 may include any suitable electronic or computing device such as, but not limited to, a mobile phone, a tablet, a laptop, a desktop computer, a smartphone, a personal computer, an electronic tablet, a wearable device, a smart device such as smart TV or smart appliance, etc. Further, the user 124 may be any person or an organization using the system proposed in the present disclosure for monitoring and controlling an operation of the critical load 102.

In an example implementation, the critical load 102 may include data centers' servers which have a direct impact on the ability of an organization to operate. When the supply from the grid 106 fails or is shut down, the critical load must be kept running to avoid system failures, data corruption, life-shortening hardware damage, and/or the like. In accordance with another example implementation, the critical load 102 may include life support systems at hospitals which also require a continuous supply of power. In yet another example implementation, the critical load 102 can include any critical load that requires a continuous supply of power, without limiting the scope of the invention. Thus, in order to keep the critical load 102 running independently of the power from the grid 106, or to reduce dependency and power consumption from the grid 106, the one or more fuel cell systems such as the fuel cell systems 116 and 118 are provided.

In some embodiments, the fuel cell systems 116 and 118 may include a solid oxide fuel cell (SOFC) system. The term "solid oxide fuel cell" refers to a fuel cell system that has a solid oxide or a ceramic electrolyte and produces electricity, water, heat, and small amounts of carbon dioxide using natural gas (e.g., methane) as fuel. For example, the fuel cell system 116 or 118 may include a single fuel cell or a predefined count of fuel cells stacked adjacent to each other. Each fuel cell can generate power of a predefined capacity, and by stacking a plurality of fuel cells with each other, more power can be generated. For instance, the fuel cell systems 116 and 118 may have a power capacity of about 12.5 Mega-Watt (MW). In other examples, the fuel cell systems 116 and 118 may have a power capacity that is above 12.5 MW.

Further, in one scenario, the critical load 102 can require power more than the power capacity of one of the fuel cell systems 116 and 118. As a result, the critical load 102 is partitioned into the at least two portions 102A and 102B as depicted in FIG. 1, and each portion of 102A and 102B is provided with power from the fuel cell systems 116 and 118, respectively. For example, the portion 102A is connected to the fuel cell system 116 and the portion 102B is connected to the fuel cell system 118. Moreover, the portions 102A and 102B receive power from the utility feeders 108 and 110, respectively.

In another scenario, the critical load 102 can require power less than or equal to the power capacity of one of the fuel cell systems 116 and 118. In such a scenario, partitioning of the critical load 102 is not needed and a single fuel cell system 116 or 118 is sufficient for the critical load 102 to function. In some embodiments, the critical load 102 is partitioned into more than two portions based on the amount of power that a single fuel cell system 116 or 118 can supply. Accordingly, a single fuel system 116 or 118 is connected to each portion of the critical load 102.

As may be understood, the fuel cell system 116 or 118 operates in one of the at least two operating modes based on whether the supply of power from the grid 106 is available or not, and whether the critical load 102 is partitioned or not. The at least two operating modes may include the grid-forming mode and the grid-following mode. Further, it should be noted that different scenarios for switching operating modes of the fuel cell systems 116 and 118 are explained in the description of the present disclosure with reference to FIGS. 2, 3, 4A, 4B, and 5.

In the grid-following mode, an inverter of the fuel cell system 116 or 118 tracks a voltage angle of the grid 106 to control an output (synchronizing to the grid) of the inverter. In the grid-forming mode, the inverter of the fuel cell system 116 or 118 actively controls the frequency and voltage output of the inverter. One important difference is that, in the grid-forming mode, the fuel cell system 116 or 118 is constantly working to keep frequency and voltage stable at setpoints, whereas in the grid-following mode, the fuel cell system 116 or 118 only responds to correct the frequency and voltage when they deviate outside of a certain allowed range.

In an example implementation, the fuel cell system 116 along with the utility feeder 108 connected to the portion 102A of the critical load 102 forms a microgrid. Similarly, the fuel cell system 118 along with the utility feeder 110 connected to the portion 102B of the critical load 102 forms another microgrid. By controlling the operation of the load circuit breaker 104 and the utility circuit breakers 112 and 114, the configuration of these microgrids associated with the critical load 102 can be controlled. This operation is monitored and controlled by the controller 120. This implies that the controller 120 also controls the switching of the operating modes of the fuel cell systems 116 and 118 which is dependent on the operation of the circuit breakers 104, 112, and 114. For example, the controller 120 may be a microgrid controller. Further, in some embodiments, the system includes at least two fuel cell controllers (not shown in FIG. 1) associated with the fuel cell systems 116 and 118 respectively. Each of the at least two fuel cell controllers is configured to control an operation of at least one fuel cell system of the two fuel cell systems 116 and 118, based at least on instructions from the user device 122 and the controller 120. Moreover, in an example, the utility circuit breaker 112 or 114 can include a circuit breaker that controls a flow of current from the grid 106 to the critical load 102 through the utility feeder 108 or 110. Similarly, the load circuit breaker 104 can include a circuit breaker that controls a flow of current between the two portions 102A and 102B of the critical load 102.

It should be noted that for simplicity, in the further description, the portions 102A and 102B of the critical load 102 are interchangeably referred to as a first portion 102A and a second portion 102B of the critical load 102. Similarly, the utility feeders 108 and 110 are interchangeably referred to as a first utility feeder 108 and a second utility feeder 110. Further, the utility circuit breakers 112 and 114 are interchangeably referred to as a first utility breaker 112 and a second utility breaker 114. Furthermore, the fuel cell systems 116 and 118 are interchangeably referred to as a first fuel cell system 116, and a second fuel cell system 118, respectively.

In an example implementation, the controller 120 is configured to receive a plurality of values corresponding to one or more electrical parameters from the utility circuit breakers 112 and 114 and the load circuit breaker 104. For example, the one or more electrical parameters can include a current, voltage, power, and/or the like at each of the utility circuit breakers 112 and 114 and the load circuit breaker 104. In an embodiment, each of utility circuit breakers 112 and 114 and the load circuit breaker 104 can be equipped with one or more electrical sensors (not shown in FIG. 1) that sense the one or more electrical parameters periodically within a predefined period. For example, the one or more electrical sensors may include a current sensor, a voltage sensor, a power sensor, and/or the like. More specifically, in some embodiments, the one or more electrical sensors may include current transformers and/or voltage transformers for sensing or monitoring voltages at the circuit breakers. The controller 120 then fetches and operates upon the plurality of values corresponding to the one or more electrical parameters from the one or more electrical sensors. Thus, in an instance, the controller 120 is communicatively coupled to the utility circuit breakers 112 and 114, the load circuit breaker 104, the fuel cell systems 116 and 118, and the user device 122 via a network (not shown in FIG. 1) such as a wireless or wired communication network. The network may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among certain entities illustrated in FIG. 1, or any combination thereof.

It should be noted that the number of users, the user devices, the critical loads, portions in the critical load, utility feeders to each critical load, fuel cell systems to each critical load, utility circuit breakers, and load circuit breakers described herein are only used for exemplary purposes and do not limit the scope of the invention. The main objective of the invention is to provide a facility to the user for controlling the configuration of the one or more microgrids associated with the critical load for controlling the operating mode of the one or more fuel cell systems connected to the critical load.

The controller 120 can be configured to detect the availability status of each of the first utility feeder 108 and the second utility feeder 110 to supply power to the first portion 102A and the second portion 102B of the critical load 102 respectively, based at least on the plurality of values. For example, the availability status can include 'available to supply power' or 'unavailable to supply power'. Consider an example, in which only the first utility feeder 108 supplies power to the critical load 102 and the second utility feeder 110 does not. In such a scenario, the values corresponding to the one or more electrical parameters that the controller 120 receives from the first circuit breaker 112 may be a positive value or a value greater than or equal to a threshold value. Further, the values that the controller 120 receives from the second circuit breaker 114 may be nil (zero) or less than the threshold value as the second circuit breaker 114 is open. Thus, in this example, the availability status of the first utility feeder 108 is 'available to supply power', and the availability status of the second utility feeder 110 is 'unavailable to supply power'.

The controller 120 can also be configured to detect a connection status associated with the load circuit breaker 104 positioned between the first portion 102A and the second portion 102B of the load 102, based at least on the plurality of values. For example, the connection status associated with the load circuit breaker 104 includes 'connected' or 'disconnected'. In an embodiment, the connection status of the load circuit breaker 104 is 'connected' when the values corresponding to the one or more electrical parameters received from the load circuit breaker 104 are a positive value or a value greater than or equal to a threshold value. In another embodiment, the connection status of the load circuit breaker 104 is 'disconnected' when the values corresponding to the one or more electrical parameters received from the load circuit breaker 104 are nil(zero) or a value less than the threshold value.

The controller 120 can be configured to facilitate each of the first fuel cell system 116 and the second fuel cell system 118 to operate in one of the at least two operating modes in response to at least one of a) the availability status of each of the first utility feeder 108 and the second utility feeder 110, and b) the connection status associated with the load circuit breaker 104. For example, if the availability status of the first utility feeder 108 is 'available to supply power' and the availability status of the second utility feeder 110 is 'unavailable to supply power', and the connection status of the load circuit breaker 104 is 'connected', both the first fuel cell system 116 and the second fuel cell system 118 may operate in the grid-following mode.

In some embodiments, the controller 120 can be configured to receive a plurality of operating details corresponding to the critical load 102 and a plurality of fuel cell-related details via the user device 122 associated with the user 124. For example, the plurality of operating details corresponding to the critical load 102 can include at least one of operating power limits, operating voltage limits, operating current limits, operating frequency limits, and the like. Similarly, the plurality of fuel cell-related details may include at least one of a storage capacity of each fuel cell system, a count of one or more fuel cell systems, a count of one or more inverters, one or more electrical parameters, and the like corresponding to the one or more fuel cell systems.

The controller 120 can also be configured to generate a control signal based, at least, in part on a comparison of the plurality of operating details with the plurality of fuel cell-related details. The control signal can include information instructing the load circuit breaker 104 to open or close based on the comparison. The controller 120 can be configured to facilitate the critical load 102 to partition into the portions 102A and 102B by transmitting the control signal to the load circuit breaker 104 when the control signal includes information instructing the load circuit breaker 104 to open. Alternatively, if the control signal includes information instructing the load circuit breaker 104 to close, then upon transmitting the control signal to the load circuit breaker 104, the critical load 102 is facilitated to close the partition and form a single closed circuit for the critical load 102.

In a use-case example, the controller 120 can check the storage capacity or the power capacity of each of the fuel cell systems 116 or 118 which may be about 12.5 MW. Then, the controller 120 can check the operating requirements of the load 102. Suppose the operating requirements of the load 102 include a demand for a minimum power supply that is more than the storage capacity of the fuel cell system 116 or 118. In that scenario, the controller 120 generates and transmits a control signal to the load circuit breaker 104, where the control signal instructs the load circuit breaker 104 to open, and hence the critical load 102 splits into the portions 102A and 102B. In this scenario, the fuel cell systems 116 and 118, each with a storage capacity of 12.5 MW may be provided to each of the portions 102A and 102B, respectively. This is feasible because a minimum power supply that each of the portions 102A and 102B of the critical load 102 demands would be less than or equal to the storage capacity of one of the fuel cell systems 116 and 118.

In some embodiments, the two fuel cell systems 116 and 118 may operate as a connected unit. The environment 100 also depicts an electrical interlocking device 126 positioned between the two fuel cell systems 116 and 118. As used herein, the term "electrical interlocking device" positioned between two components refers to circuitry that facilitates interconnecting or disconnecting the two components with each other for allowing or preventing the flow of electric current between the two components.

In an embodiment, the two fuel cell systems 116 and 118 can operate as a single connected unit or two separate units based, at least in part, on an operating status of the electrical interlocking device 126. In case the operating status of the electrical interlocking device 126 is 'activated', the two fuel cell systems 116 and 118 operate as a connected unit, which is further elaborated with reference to FIG. 5. In case the operation status of the electrical interlocking device 126 is 'deactivated', the two fuel cell systems 116 and 118 operate as two separate units.

In some embodiments, the controller 120 can receive one or more operational parameters associated with the critical load 102 as the critical load 102 (having portions 102A and 102B) operates when each of the fuel cell systems 116 and 118 operate in one of the at least two operating modes. For example, the one or more operational parameters associated with the critical load 102 can include at least one of output voltage, output current, output power, electrical losses, and the like. The controller 120 can identify one or more risks associated with the operation of the critical load 102 based at least on the one or more operational parameters. Further, the controller 120 can generate one or more recommendations for optimizing the operation of the fuel cell systems 116 and 118, based at least on historical data. For instance, the historical data may correspond to data related to countermeasures implemented in other similar systems under similar scenarios for optimizing the operation of the load. The one or more recommendations may correspond to one or more countermeasures for addressing the one or more risks associated with the operation of the critical load 102. For example, the one or more countermeasures may include tuning inverter control parameters and/or adding additional hardware equipment such as synchronous condensers, harmonic filters, and the like.

In some embodiments, the system is built on a software platform and simulated for steady state and transient cases, where several corner cases are reviewed from different aspects such as fault clearing capability, system voltage, and frequency stability, load changes, load sharing, power quality, and black start. Further, examples of software platforms that can be used for the complete system analysis can include Electrical Transient and Analysis Program (ETAP) and Power Systems Computer Aided Design (PSCAD) software packages.

Figure 2:
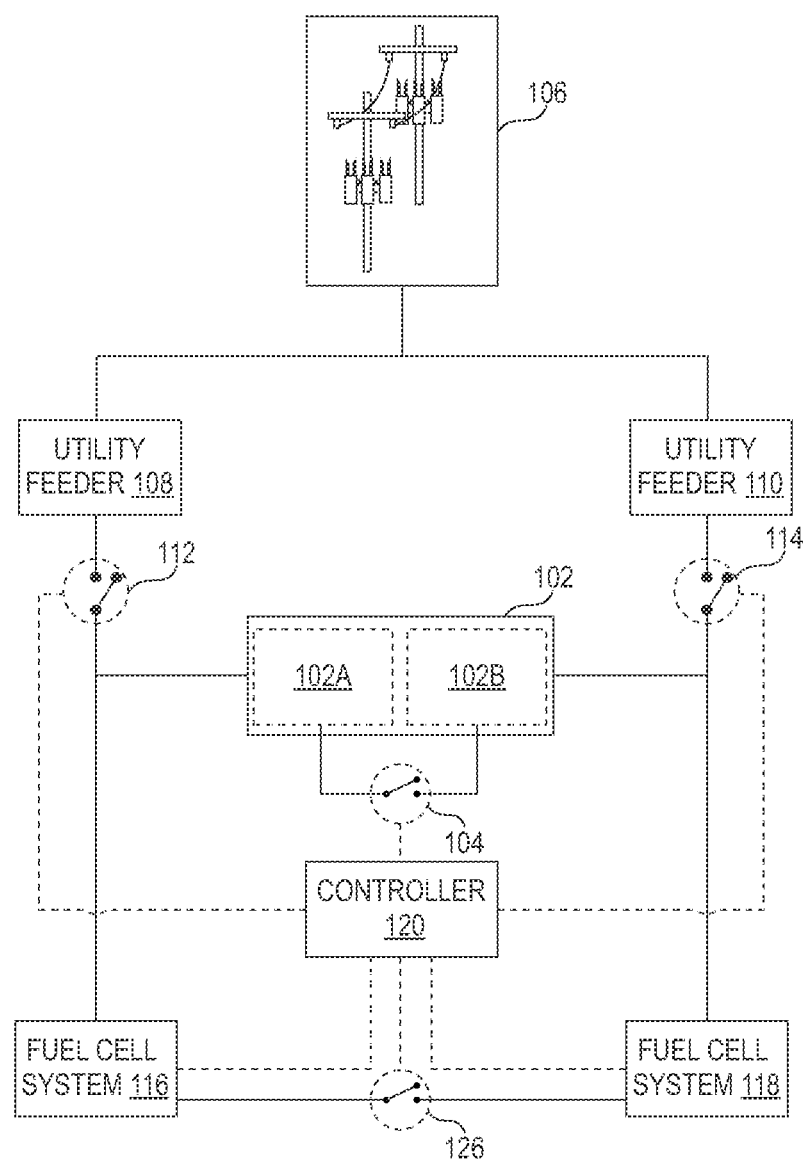
FIG. 2 is a block diagram representing a setup for a system controlling operating modes of one or more fuel cell systems connected to a critical load in a scenario of a grid being unavailable, in accordance with an embodiment of the present disclosure.

FIG. 2 is a block diagram representing a setup 200 for the system controlling the operating modes of the one or more fuel cell systems (e.g., the first fuel cell system 116 and the second fuel cell system 118) connected to the critical load 102 in a scenario of the grid 106 being unavailable, in accordance with an embodiment of the present disclosure. The grid 106 is unavailable under scenarios when there is some technical issues or an operational failure in electrical components that are responsible for transmitting power from power stations to the critical load 102 through the grid 106. Further, the utility circuit breakers (e.g., the first utility circuit breaker 112 and the second utility circuit breaker 114) are provided to protect a circuitry of the critical load 102 from damage due to any kind of electrical faults in the grid 106. Thus, the utility circuit breakers 112 and 114 can open or close based on the detection of any kind of electrical faults in the grid 106.

In a scenario where the grid 106 is unavailable, the utility circuit breakers 112 and 114 may open and hence, the plurality of values that the controller 120 receives may be nil (zero) or less than the predefined threshold value. Further, the availability status corresponding to the first utility feeder 108 and the second utility feeder 110 detected by the controller 120 corresponds to 'unavailable to supply power'. Since the first utility feeder 108 and the second utility feeder 110 are unavailable to supply power to the load 102, the first fuel cell system 116 and the second fuel cell system 118 are now the only sources to supply power to the critical load 102. Assuming an operational requirement for the load 102 is more than the storage capacity of a single fuel cell system 116 or 118, the load 102 is partitioned into the first portion 102A and the second portion 102B. The controller 120 can identify this partitioning of the critical load 102 based on the connection status of the load circuit breaker 104 which is detected as 'disconnected'. Based on the availability status and the connection status, the controller 120 can facilitate the first fuel cell system 116 and the second fuel cell system 118 to operate in the grid-forming mode independently, keeping both load voltage and frequency within a specific permissible range as the first fuel cell system 116 and the second fuel cell system 118 provide power to the critical load 102.

Also, the electrical interlocking device 126 remains deactivated because, in the absence of supply from the grid 106 on either side of the load 102, the two fuel cell systems 116 and 118 cannot be combined/connected because of the size limitations.

Subsequently, when the grid 106 is unavailable and the microgrids are operating in the grid-forming mode, the critical load 102 initially experiences a complete blackout. Further, a black start of the first fuel cell system 116, and the second fuel cell system 118 may have to be energized in a predefined sequence. This process of the black start and its related processes are explained in detail with reference to FIGS. 7A, 7B, 8A, and 8B.

In one example implementation, a step load capability of each of the first fuel cell system 116 and the second fuel cell system 118 may be about 4 MW if the power capacity of each of the first fuel cell system 116 and the second fuel cell system 118 is about 12.5 MW. As used herein, the term "step load capability" refers to an amount of load that can be placed on a portable source at one time. Here the portable source may be the first fuel cell system 116 and the second fuel cell system 118. Thus, each of the first fuel cell system 116, and the second fuel cell system 118 accepts the critical load 102 in one load step or may spread it over several load steps.

In a specific example, the critical load 102 can receive power from the first fuel cell system 116 and the second fuel cell system 118 in the grid-forming mode until the grid 106 is again available for the critical load 102. This mode of operation is also referred to as an off-grid mode of operation. Alternatively, the user 124 may choose to operate the critical load 102 in the off-grid mode even after the grid 106 is available to supply power to the critical load 102. Further, in one scenario, the electrical interlocking device 126 may continue to remain deactivated based on the operating requirements of the load 102. In another scenario, the electrical interlocking device 126 may be activated, thereby interlocking the two fuel cell systems 116 and 118 with each other. As a result, the two fuel cell systems 116 and 118 operate as a connected unit.

Figure 3:
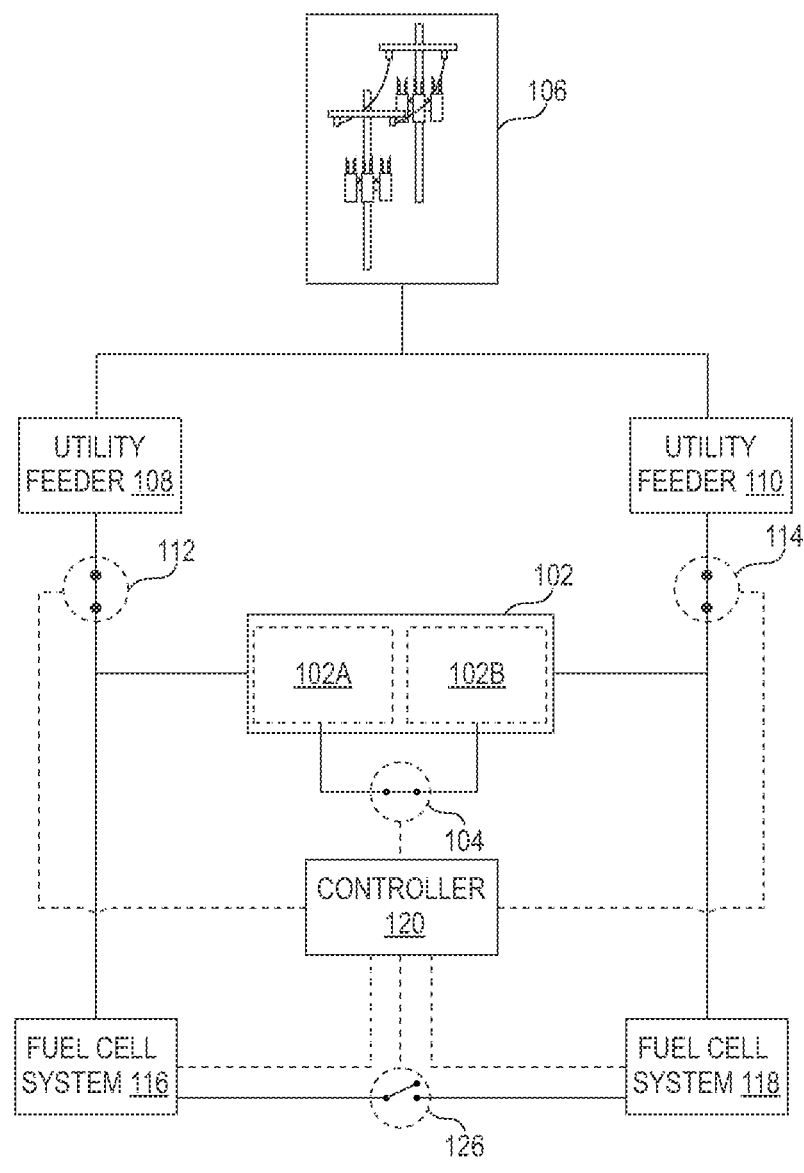
FIG. 3 is a block diagram representing a setup for a system controlling operating modes of one or more fuel cell systems connected to a critical load in a scenario of the grid being available, in accordance with an embodiment of the present disclosure.

FIG. 3 is a block diagram representing a setup 300 for the system controlling the operating modes of the one or more fuel cell systems (e.g., the first fuel cell system 116 and the second fuel cell system 118) connected to the critical load 102 in a scenario of the grid 106 being available, in accordance with an embodiment of the present disclosure. In this scenario, the critical load 102 is not partitioned and hence the load circuit breaker 104 has the connection status as 'connected' which is sensed by the controller 120. The availability status corresponding to the first utility feeder 108 and the second utility feeder 116 is 'available to supply power' which is also sensed by the controller 120. Accordingly, based on the connection status and the availability status, the controller 120 instructs the first fuel cell system 116 and the second fuel cell system 118 to operate in the grid-following mode.

In this scenario, both the first fuel cell system 116 and the second fuel cell system 118 connect to the first utility feeder 108 and the second utility feeder 116, respectively, and work in the grid-following mode and can be referred to as current sources, where the first fuel cell system 116 and the second fuel cell system 118 produce an adjustable amount of power. For instance, both the first fuel cell system 116 and the second fuel cell system 118 follow power setpoints in kilowatts (kW), which translates to a current value at a certain (adjustable) power factor (PF) based on voltage measured at their terminals. In some embodiments, the first fuel cell system 116 and the second fuel cell system 118 can stop producing power and cease to energize the critical load 102 as soon as the grid 106 is deemed out of range as this is a standard requirement. Moreover, this range of operation follows local utility interconnection guidelines including, but not limited to, Institute of Electrical and Electronics Engineers (IEEE) 1547-2018 standard guidelines.

The electrical interlocking device 126 may remain deactivated or may connect the two fuel cell systems 116 and 118 with each other based on the operating requirements of the load 102. In the scenario illustrated in FIG. 3, the electrical interlocking device 126 is deactivated, and hence the two fuel cell systems 116 and 118 operate independently to supply the required amount of power to each portion 102A and 102B of the load 102, respectively.

Figure 4A:
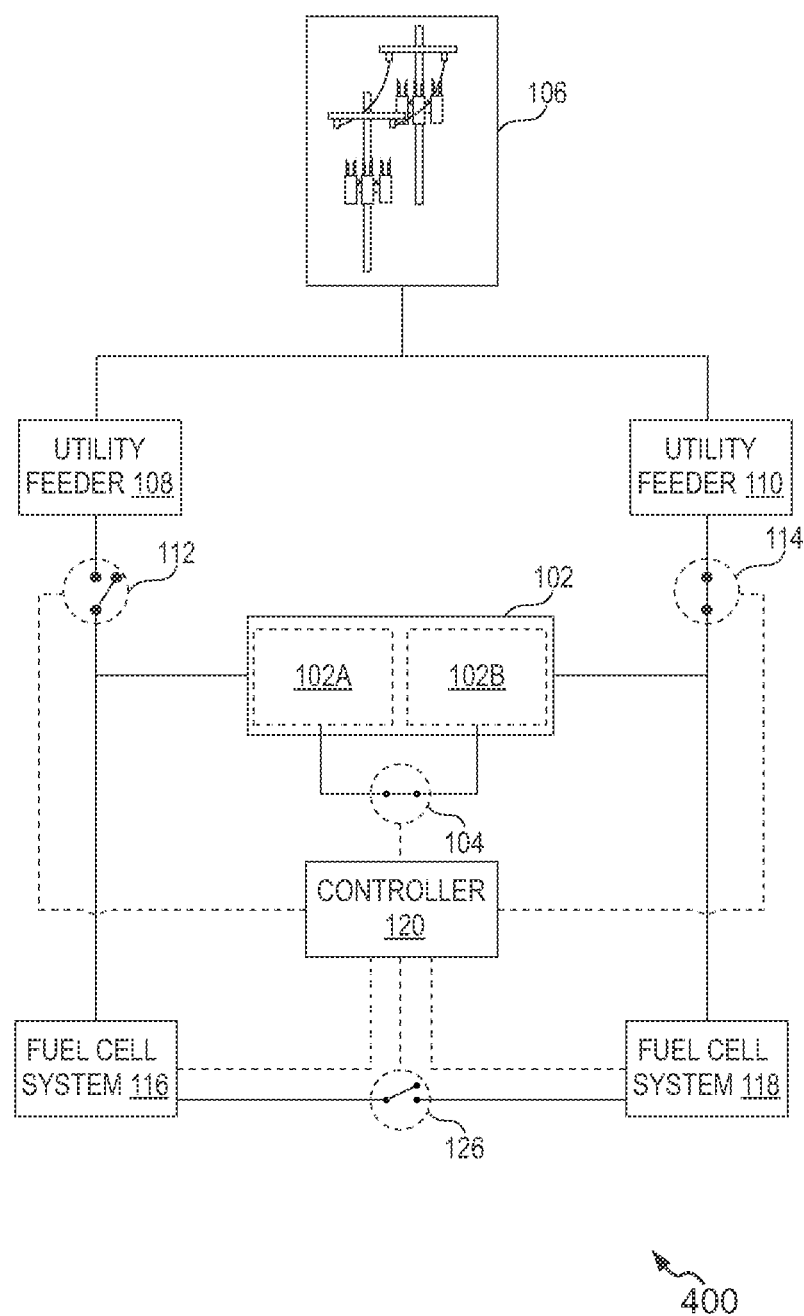
FIG. 4A is a block diagram representing a setup for a system controlling operating modes of one or more fuel cell systems connected to a critical load in a scenario of the grid being available for at least one portion of the critical load, in accordance with an embodiment of the present disclosure.

FIG. 4A is a block diagram representing a setup 400 for the system controlling operating modes of the one or more fuel cell systems (e.g., the first fuel cell system 116 and the second fuel cell system 118) connected to the critical load 102 in a scenario of the grid 106 being available for at least one portion of the critical load 102, in accordance with an embodiment of the present disclosure. Assume that the first utility feeder 108 is unavailable and the second utility feeder 110 is available for supplying power to the critical load 102. Thus, the second portion 102B of the critical load 102 receives power from the grid 106 through the second utility feeder 110, and the first portion 102A of the load 102 receives power from the grid 106 through the second utility feeder 110. Thus, the controller 120 detects the availability status of the first utility feeder 108 as 'unavailable to supply power' and the availability status of the second utility feeder 110 as 'available to supply power'.

Further, assuming that the critical load 102 is not partitioned, the controller 120 detects the connection status of the load circuit breaker 104 as 'connected'. Subsequently, based on the availability status and the connection status, the controller 120 instructs the first fuel cell system 116 and the second fuel cell system 118 to operate in the grid-following mode.

For instance, in this scenario, both the first fuel cell system 116 and the second fuel cell system 118, and both the first portion 102A and the second portion 102B of the critical load 102 are connected to the grid 106 through the second utility feeder 110. Hence, both the first fuel cell system 116 and the second fuel cell system 118 operate in the grid-following mode. Further, if the second utility feeder 110 also gets disconnected, while the first fuel cell system 116 and the second fuel cell system 118 operate in the grid-following mode, the critical load 102 is split into the portions 102A and 102B for the first fuel cell system 116 and the second fuel cell system 118 to work in the grid-forming mode.

The electrical interlocking device 126 may remain deactivated or may connect the two fuel cell systems 116 and 118 with each other based on the operating requirements of the load 102. In the scenario illustrated in FIG. 4A, the electrical interlocking device 126 is deactivated, and hence the two fuel cell systems 116 and 118 operate independently to supply the required amount of power to each portion 102A and 102B of the load 102, respectively. However, in this scenario, the electrical interlocking device 126 can be made to connect the two fuel cell systems 116 and 118 as one of the utility feeders i.e., the utility feeder 110 is available. If the utility feeder 110 also becomes unavailable, the electrical interlocking device 126 may have to be deactivated because of the size limitations.

Figure 4B:
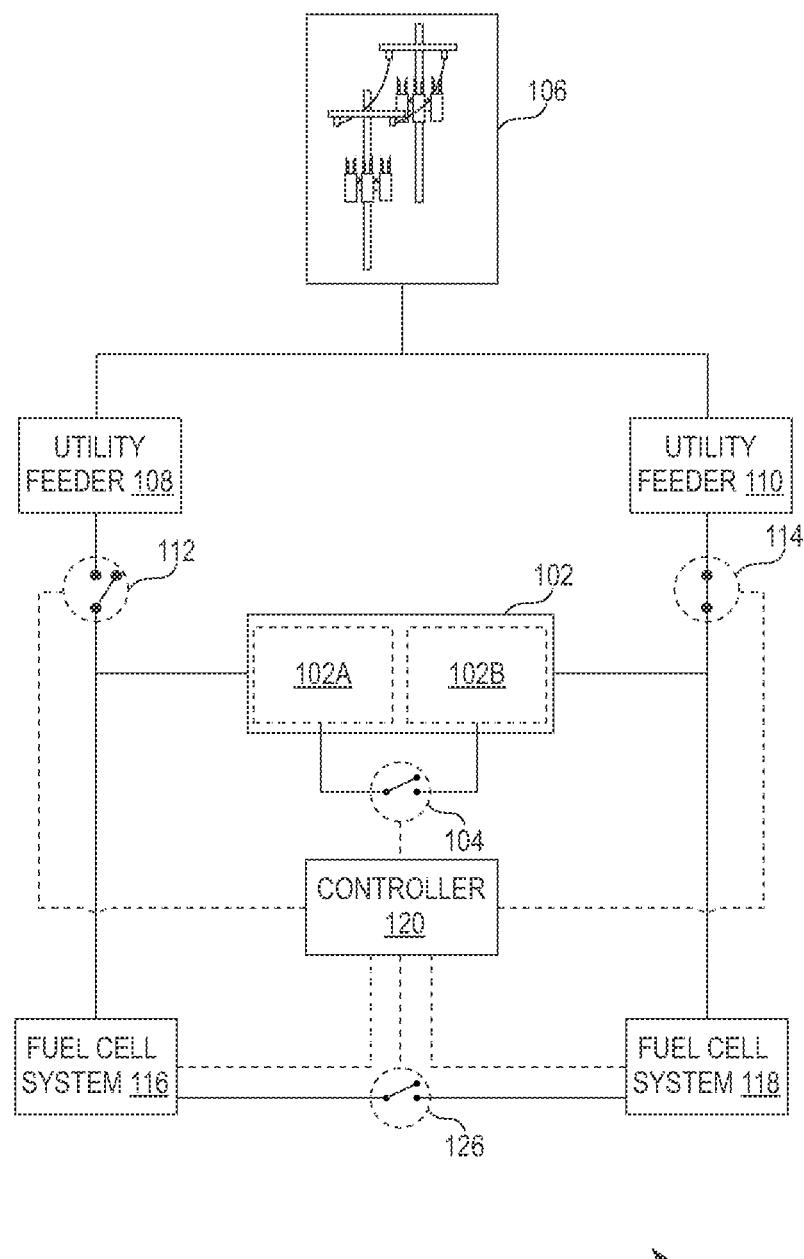
FIG. 4B is a block diagram representing a setup for a system controlling one or more operating modes of one or more fuel cell systems connected to a critical load in another scenario of the grid being available for at least one portion of the critical load, in accordance with an embodiment of the present disclosure.

FIG. 4B is a block diagram representing a setup 450 for the system controlling the operating modes of the one or more fuel cell systems (e.g., the first fuel cell system 116 and the second fuel cell system 118) connected to the load 102 in another scenario, namely the grid 106 being available for at least one portion of the critical load 102. In this scenario, the first utility feeder 108 is unavailable and the second utility feeder 110 is available for supplying power to the critical load 102. However, the critical load 102 is partitioned into the first portion 102A, and the second portion 102B. Thus, the second portion 102B of the load 102 receives power from the grid 106 through the second utility feeder 110 and the first portion 102A of the load 102 does not receive power from the grid 106. Thus, the controller 120 detects the availability status of the first utility feeder 108 as 'unavailable to supply power' and the availability status of the second utility feeder 110 as 'available to supply power', and the connection status of the load circuit breaker 104 as 'disconnected'. Subsequently, based on the availability status and the connection status, the controller 120 instructs the first fuel cell system 116 to operate in the grid-forming mode and the second fuel cell system 118 to operate in the grid-following mode. In this scenario, if the second utility feeder 110 also gets disconnected from the critical load 102, then the second fuel cell system 118 also transitions to the grid-forming mode and the two microgrids work as two separate islands by both operating in the grid-forming mode.

Since the first fuel cell system 116 transitions from the grid-following mode to the grid-forming mode, the first fuel cell system 116 experiences the black start process. When the second utility feeder 110 also disconnects, the second fuel cell system 118 also transitions from the grid-following mode to the grid-forming mode, and hence experiences the black start process.

In this scenario, since the portions 102A and 102B are not connected with each other, the fuel cell systems 116 and 118 need not be connected, if a single fuel cell system i.e., the fuel cell system 116 connected to the portion 102A and the fuel cell system 118 connected to the portion 102B is sufficient to power the respective portions 102A and 102B. However, in scenarios where the power from a single fuel cell system is insufficient, the fuel cell systems 116 and 118 can be connected with each other via the electrical interlocking device 126.

Figure 5:
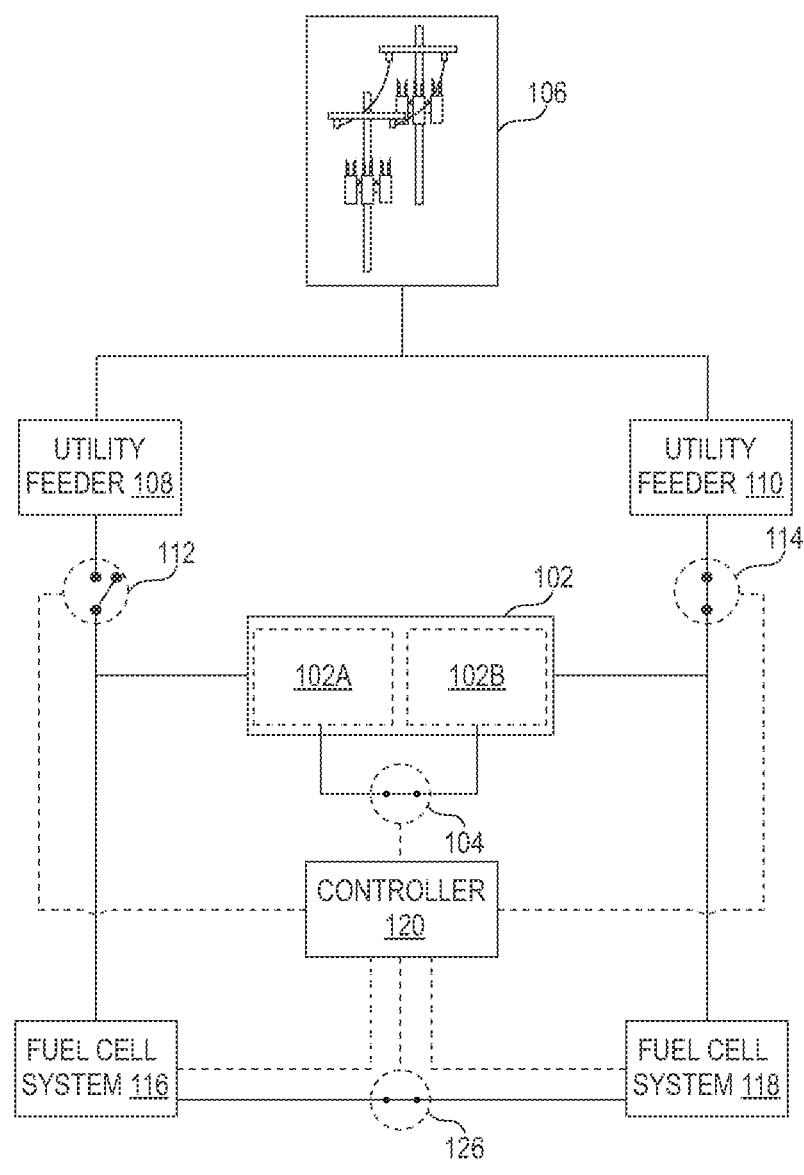
FIG. 5 is a block diagram representing a setup for a system controlling one or more operating modes of one or more fuel cell systems connected to a critical load in a scenario of the one or more fuel cell systems operating as a connected unit, in accordance with an embodiment of the present disclosure.

FIG. 5 is a block diagram representing a setup 500 for the system controlling the operating modes of the one or more fuel cell systems (e.g., the first fuel cell system 116 and the second fuel cell system 118) connected to the critical load 102 in a scenario of the one or more fuel cell systems 116 and 118 are operating as a connected unit, in accordance with an embodiment of the present disclosure. Assume that the first utility feeder 108 is unavailable and the second utility feeder 110 is available for supplying power to the critical load 102. Thus, both the first portion 102A and the second portion 102B of the critical load 102 receive power from the grid 106 through the second utility feeder 110, as the critical load 102 is not partitioned. Thus, the controller 120 detects the availability status of the first utility feeder 108 as 'unavailable to supply power', the availability status of the second utility feeder 110 as 'available to supply power', and the connection status of the load circuit breaker 104 as 'connected'. Subsequently, based on the availability status and the connection status, the controller 120 can instruct the first fuel cell system 116 and the second fuel cell system 118 to operate in the grid-following mode.

Further, as mentioned earlier, for the first fuel cell system 116 and the second fuel cell system 118 to operate as the connected unit, the status of the electrical interlocking device 126 may have to be 'connected'. Moreover, as the first fuel cell system 116 and the second fuel cell system 118 are operating as a connected unit, a power capacity of a combined fuel cell system would be more than individual fuel cell systems. For example, when the fuel cell systems 116 and 118 work as a connected unit and in the grid-following mode, the fuel cell systems 116 and 118 produce twice as much power as the fuel cell systems 116 and 118 would have produced while working as independent units. However, when the fuel cell systems 116 and 118 work in the grid-forming mode while working as the connected unit, the fuel cell systems 116 and 118 should be started together.

Further, in an example implementation, either a single controller (e.g., the controller 120) can be used for controlling the operation of both the fuel cell systems 116 and 118, or two separate controllers can be used for controlling each of the fuel cell systems 116 and 118. Moreover, in an embodiment, the controller 120 may also be configured to detect the status of the electrical interlocking device 126. Herein, the controller 120 may detect the status of the electrical interlocking device 126 via one or more electrical sensors. Further, the controller 120 may also be configured to control the operation of the electrical interlocking device 126 based, at least in part, on the availability status of each of the first utility feeder 108 and the second utility feeder 110. For example, in case the availability status of at least one of the utility feeders 108 and 110 is 'available to supply power', the controller 120 activates the electrical interlocking device 126. Further, in case the availability status of both the utility feeders 108 and 110 is 'unavailable to supply power', the controller 120 deactivates the electrical interlocking device 126.

Figure 6:
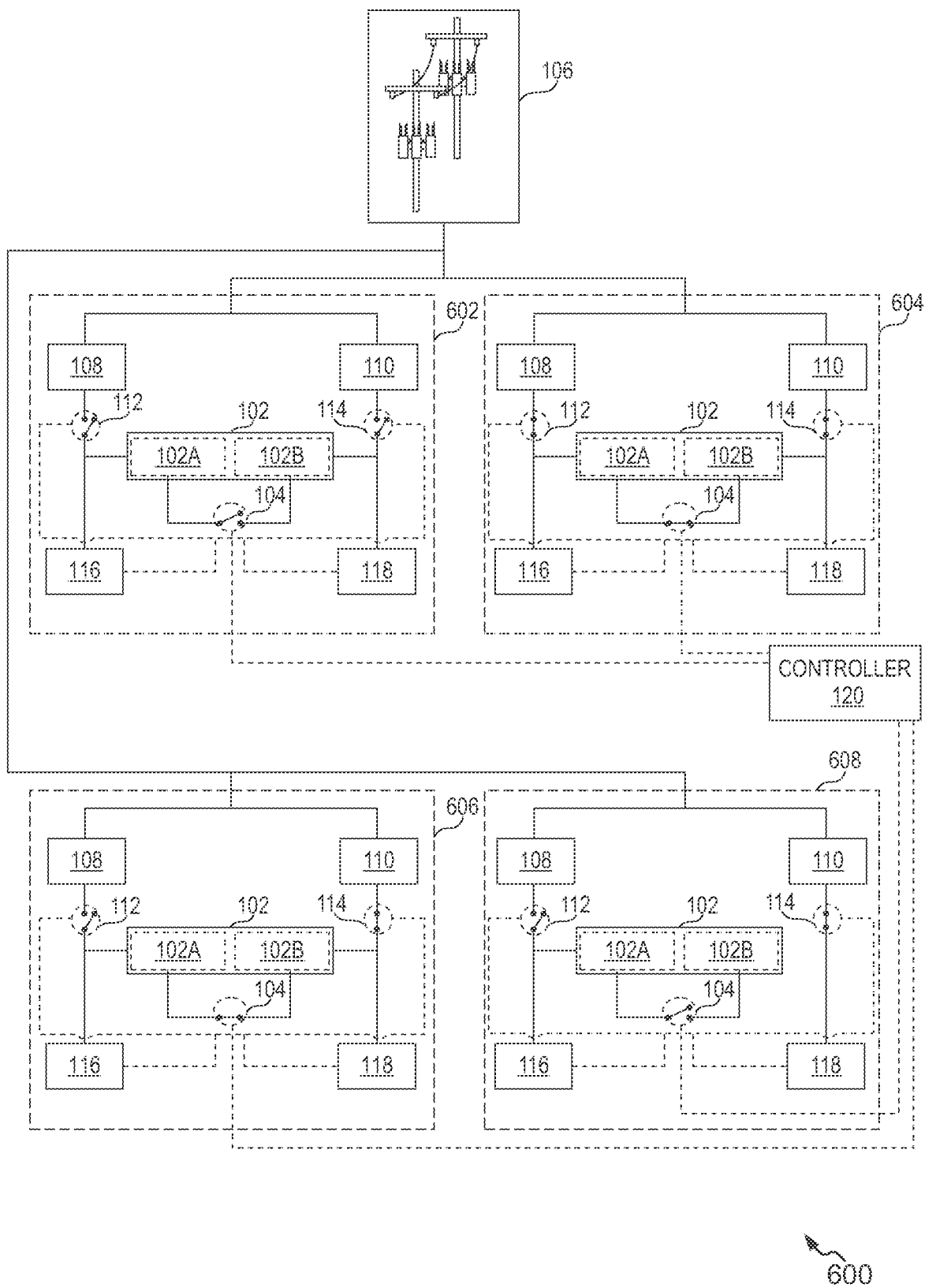
FIG. 6 is a block diagram representing a setup for a system controlling operating modes of one or more fuel cell systems connected to four loops of a data center load, in accordance with an embodiment of the present disclosure.

FIG. 6 is a block diagram representing a setup 600 for the system controlling the operating modes of the one or more fuel cell systems 116 and 118 connected to four loops of a data center load such as a data center server (the complete load), in accordance with an embodiment of the present disclosure. For instance, a typical data center server may include four loops or four data center loads which represent the complete data center load. The system proposed in the present disclosure for one load (one loop of the four loops) is applicable for all four loops, and hence FIG. 6 depicts the four loops provided with four system configurations 602, 604, 606, and 608. Further, for example, each loop may be made up of about six 2 MW normal lineups, a catcher, and a house service transformer.

For instance, a system configuration 602 can include a first loop/a first data center load such as the critical load 102 separated into portions 102A and 102B, and the fuel cell systems 116 and 118, provided to the load 102, operate in the grid-forming mode as the grid 106 is unavailable for supplying power to the load 102. Thus, the system configuration 602 illustrates the scenario explained in FIG. 2.

Similarly, a system configuration 604 can include a second loop/a second data center load such as the critical load 102 having the portions 102A and 102B connected with each other, and the fuel cell systems 116 and 118 provided to the load 102 operating in the grid-following mode as the grid 106 is available for supplying power to the load 102. Thus, the system configuration 604 illustrates the scenario explained in FIG. 3.

Further, a system configuration 606 can include a third loop/a third data center load such as the critical load 102 having the portions 102A and 102B connected with each other. Further, the fuel cell systems 116 and 118, provided to the load 102, operate in the grid-following mode as the grid 106 is available for supplying power to both the portions 102A and 102B of the load 102 even when the first utility feeder 108 in the system configuration 606 is open and the second utility feeder 110 in the system configuration 606 is closed. Thus, the system configuration 606 illustrates the scenario explained in FIG. 4A.

Furthermore, a system configuration 608 can include a fourth loop/a fourth data center load such as the critical load 102 having the portions 102A and 102B disconnected from each other, and the fuel cell system 116 provided to the first portion 102A of the load 102 operating in the grid-forming mode. However, the fuel cell system 118 provided to the second portion 102B of the load 102 is operating in the grid-following mode. In this case, the grid 106 is unavailable for supplying power to the portion 102A but available for the portion 102B of the load 102. Thus, the system configuration 606 illustrates the scenario explained in FIG. 4B. Further, the operation of all the system configurations 602, 604, 606, and 608 can be controlled by the controller 120 as shown in FIG. 6. Further, in some embodiments, each loop of the data center load can accommodate more than two fuel cell systems 116 and 118, without limiting the scope of the invention.

Figure 7A:
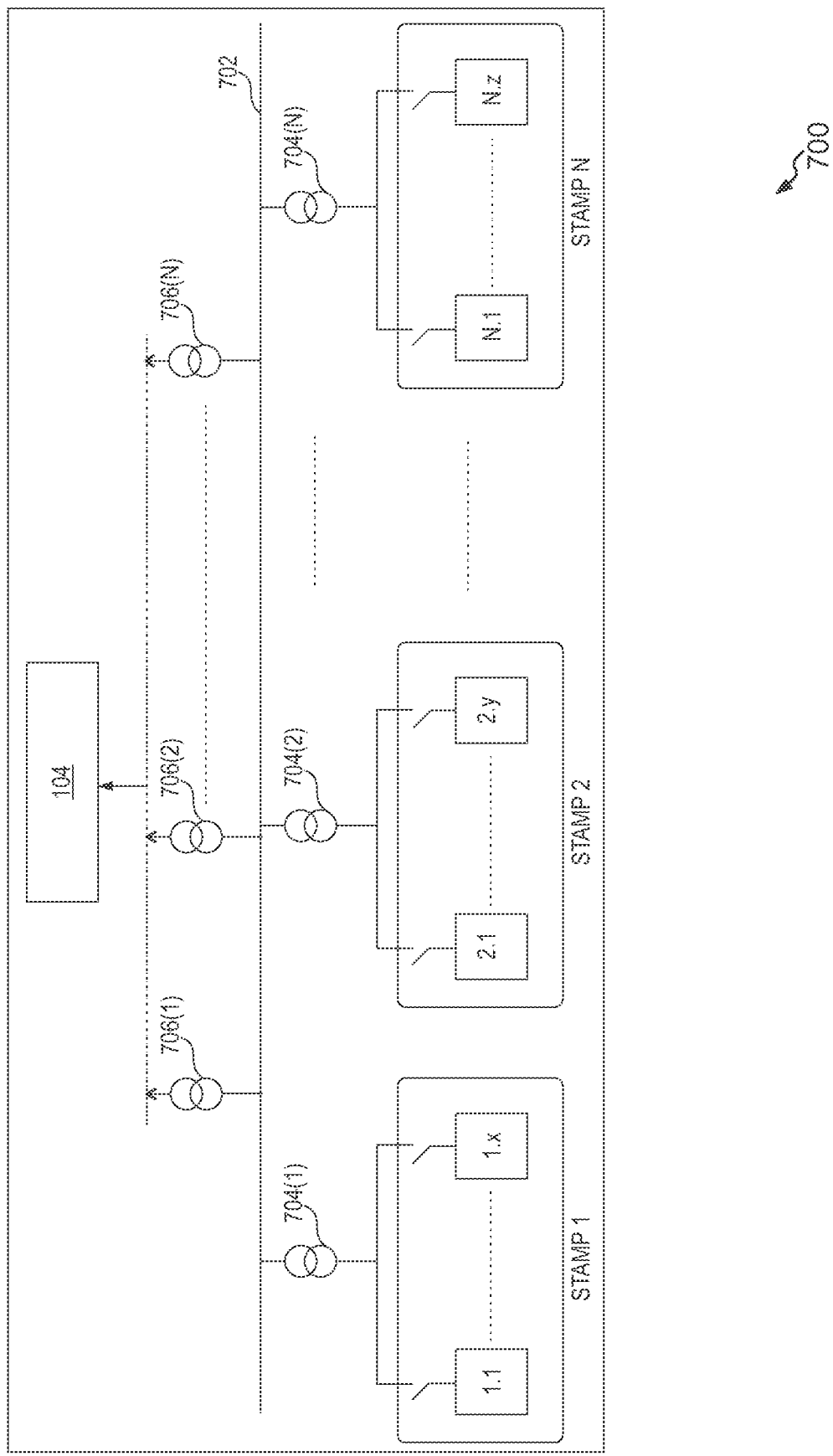
FIG. 7A is a schematic representing a setup for performing a black start process, in accordance with an embodiment of the present disclosure.

FIG. 7A is a schematic representing a setup 700 for performing a black start process, in accordance with an embodiment of the present disclosure. For instance, when the microgrids associated with the critical load 102 are operating in the off-grid mode or the first fuel cell system 116 and the second fuel cell system 118 are operating in the grid-forming mode, then the black start of the microgrids may have to be energized in the predefined sequence. The black start process typically starts with a grid-forming phase (explained further with reference to FIGS. 7A and 7B) followed by a load walk-in phase (explained further with reference to FIGS. 8A and 8B).

Generally, a large microgrid can include multiple smaller groups called stamps (stamp 1, stamp 2, . . . stamp N, 'N' being a natural number) as shown in FIG. 7A. In an example, each stamp is typically rated at 3 MW, however, the actual value of a stamp is dependent on several factors associated with a site distribution design (configuration of the microgrids associated with the critical load 102). Each stamp can include a plurality of inverters as shown in FIG. 7A, each converting Direct Current (DC) power generated by the fuel cell systems 116 and 118 to Alternating Current (AC) power.

FIG. 7A depicts the stamp 1 including the plurality of inverters labeled as 1.1, . . . 1.x ('x' is a natural number), stamp 2 including the plurality of inverters labeled as 2.1, . . . 2.y ('y' is a natural number), so on through stamp N including the plurality of inverters labeled as N.1 . . . N.z ('z' is a natural number). In this example, the labels on each of the plurality of inverters correspond to a cumulative rating of each inverter which determines how many transformers Megavolt-Amperes (MVA) can be magnetized.

Moreover, in a scenario of the power capacity of the fuel cell systems 116 and 118 being 12.5 MW, four 3 MW stamps are needed to power one portion 102A or 102B of the critical load 102. Further, outputs of the stamps are connected to a bus 702 through a plurality of fuel cell step-up transformers 704(1), 704(2), . . . 704(N) ('N' being a natural number). For instance, the plurality of fuel cell step-up transformers include low-voltage/medium-voltage (LV/MV) step-up transformers with a rating of about 20 MVA. The bus 702 is then connected to one of the at least two portions 102A or 102B of the critical load 102 through a plurality of load transformers 706(1), 706(2), . . . 706(N) ('N' being a natural number). For instance, the plurality of load transformers can include low-voltage/medium-voltage (LV/MV) transformers with a rating of about 15 MVA. The grid-forming phase starts with a bus magnetization process whose steps are explained further with reference to FIG. 7B.

Figure 7B:
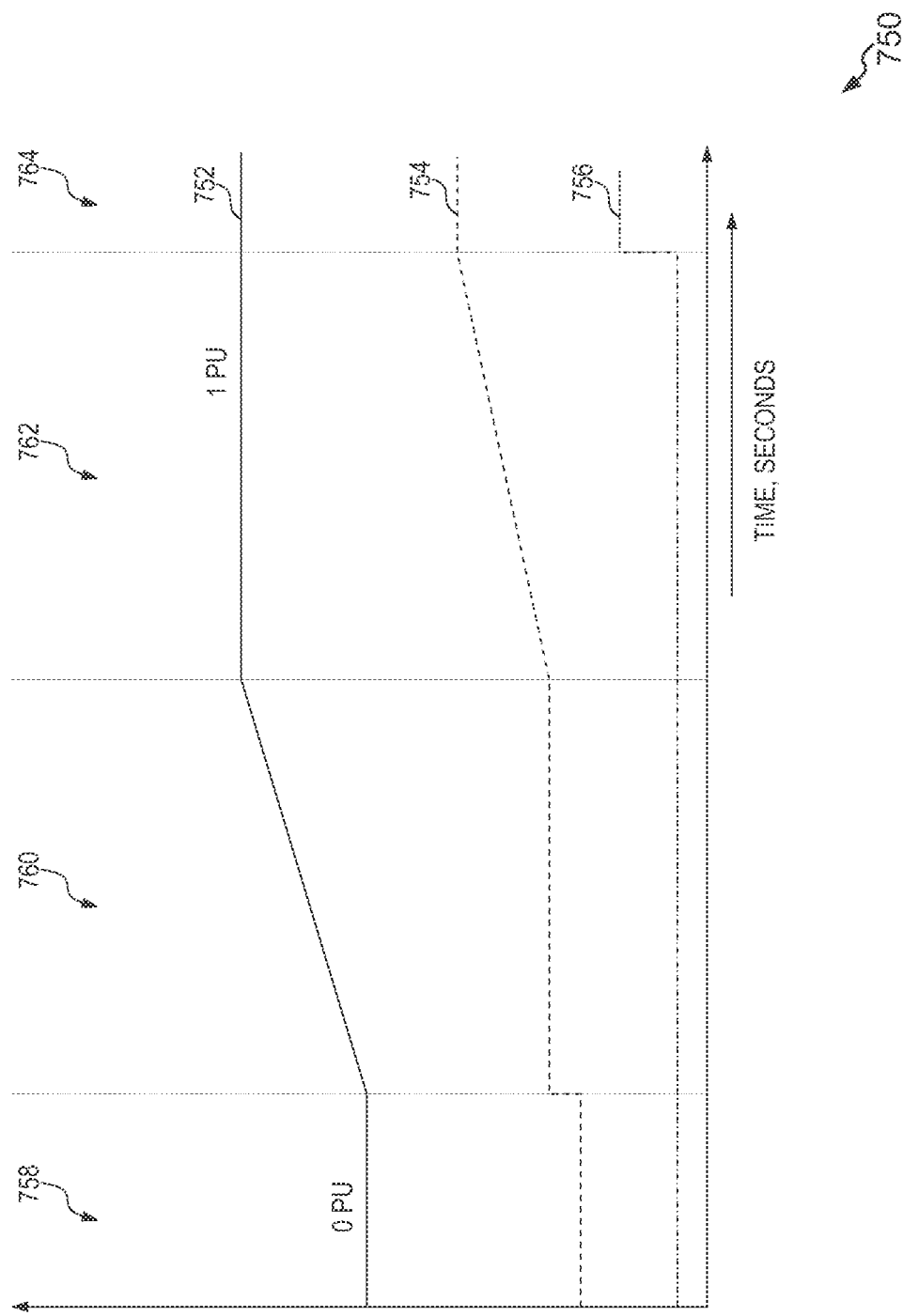
FIG. 7B is a timing diagram representing a bus magnetization process associated with the black start process, in accordance with an embodiment of the present disclosure.

FIG. 7B is a timing diagram 750 representing the bus magnetization process associated with a black start process, in accordance with an embodiment of the present disclosure. The bus magnetization process includes the following steps:

1. All the plurality of inverters (e.g., inverters 1.1, ... 1.x) in the stamp 1 are commanded by the controller 120 to turn on at the same time.
2. All the plurality of inverters in stamp 1 are in synchronization through high-speed communication.
3. The plurality of inverters in the stamp 1 slowly ramp from zero volts (0V) to a rated output. A ramp time (otherwise also referred to as voltage ramp speed) may be adjustable. The voltage ramp speed is adjustable from instantaneous to several minutes. Herein, the significance of adjusting the ramp time may correspond to being able to magnetize transformer loads or not being able to magnetize the transformer loads.
4. The plurality of inverters in stamp 1 form an island meaning the fuel cell systems 116 or 118 associated with the plurality of inverters start to operate in the grid-forming mode.
5. The plurality of inverters in stamp 2 (e.g., inverters 2.1, ... 2.y) to stamp N (e.g., inverters N.1, ... N.z) start to synchronize with voltage available.
6. The plurality of inverters in stamp 2 to stamp N are commanded by the controller 120 to join the island in the sequence (one inverter at a time).
7. The bus 702 is then ready to accept the load 102 of about 8 MW steps once all the plurality of inverters in each stamp enter the island.

In an example, during a normal operation, additional transformers cannot be magnetized without reverting to zero volts (0V) at the first step of the bus magnetization process. The timing diagram 750 as depicted in FIG. 7B includes an X-axis representing time in seconds and a Y-axis representing variation in one or more parameters such as bus voltage, the number of inverters (e.g., inverters 1.1, 1.2, ... 1.x) on the bus 702, and availability of the critical load 102 or the portion 102A or 102B of the critical load 102. The one or more parameters are represented by one or more curves that vary with time. As illustrated in FIG. 7B, the one or more curves include a curve 752 representing the variation in the bus voltage, a curve 754 representing the variation in the number of inverters, a curve 756 representing the availability of the load 102 or the portion 102A or 102B of the load 102. Further, for instance, the one or more curves in FIG. 7B is depicted to be separated into four sections at four different time slots. A first section 758 indicates a scenario in which the plurality of inverters in each stamp is 'off', and the critical load 102 or the portion 102A or 102B of the critical load 102 is not connected to the bus 702. Thus, the bus voltage is 0 per-unit system (PU) as the bus 702 does not receive any power from the plurality of inverters. As used herein, the term "Per-unit system" in the power system analysis field of electrical engineering, refers to an expression of system quantities (e.g., power, voltage, current, impedance, etc.) as fractions of a defined base unit quantity.

Similarly, a second section 760 indicates a scenario in which the plurality of inverters (e.g., inverters 1.1, ... 1.x) in stamp 1 is turned 'on' simultaneously to support inrush load, and the portion 102A or 102B of the critical load 102 still being disconnected from the bus 702. Thus, the bus voltage slowly starts to ramp from 0V to the rated output which is about 1 PU. Further, a third section 762 indicates a scenario in which the plurality of inverters in stamp 2 (e.g., inverters 2.1 ... 2.y) to stamp N (e.g., inverters N.1 ... N.z) are turned 'on' one by one, and the portion 102A of the critical load 102 is still disconnected from the bus 702. However, the bus voltage remains the same which is about 1 PU. Finally, in a fourth section 764, the critical load 102 is connected to the bus 702, the plurality of inverters in each stamp is on the bus 702, the bus has a bus voltage of about 1 PU, and the bus 702 is ready to provide power to the portion 102A of the critical load 102.

In some embodiments, the bus magnetization process explained above is followed in order to reduce inrush currents to manageable levels. Moreover, in an example, it is important to note that bringing a transformer to a fully operational live bus 702 results in significant voltage drops caused by the inrush currents drawn by a newly added transformer and any previously activated transformers. This causes the plurality of inverters on the bus 702 to trip. Therefore, large transformers must always be energized through a soft start process. In other words, if a large transformer is to be added to the bus 702, then the bus 702 may have to be de-energized to 0V first, connect the transformer, and then re-energize the bus 702 through the soft start process as described above in the bus magnetization process.

Figure 8A:
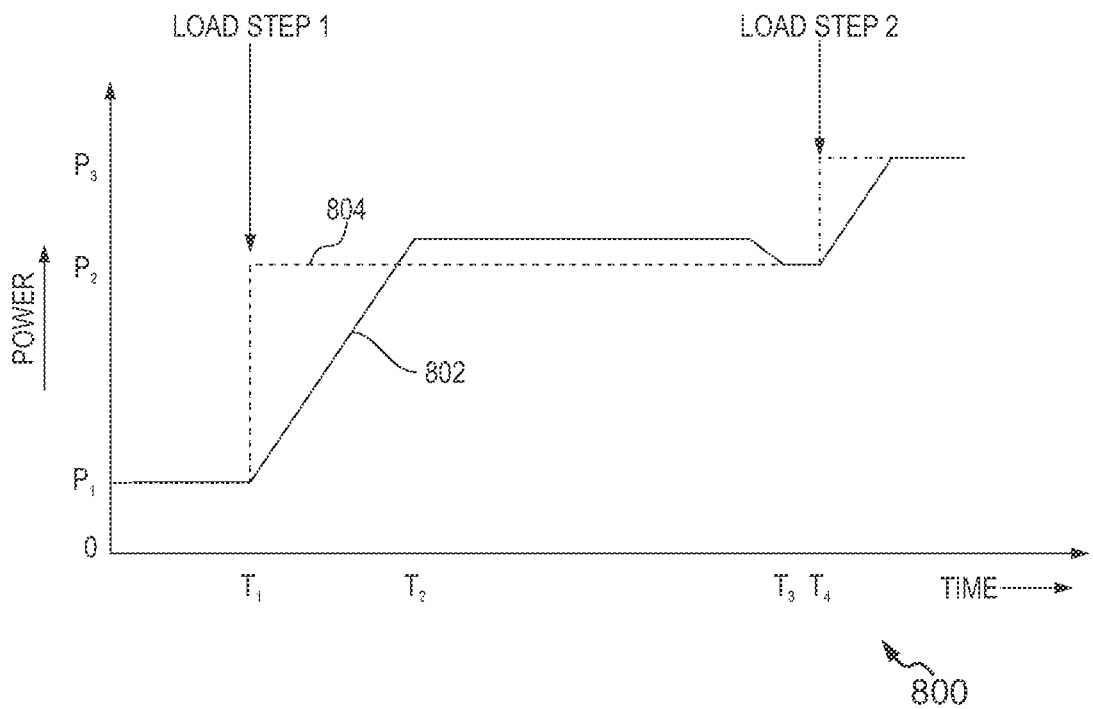
FIG. 8A and FIG. 8B are timing diagrams, collectively representing a load walk-in process associated with the black start process, in accordance with an embodiment of the present disclosure.
Figure 8B:
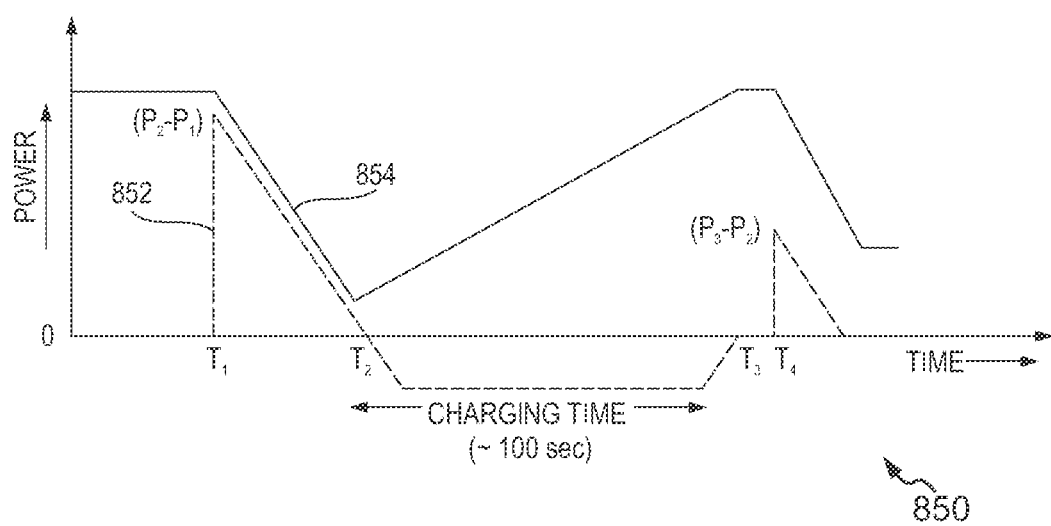

FIG. 8A and FIG. 8B are timing diagrams 800 and 850, collectively representing the load walk-in process associated with the black start process, in accordance with an embodiment of the present disclosure. For example, after the grid-forming phase is completed, the critical load 102 or the portion 102A or 102B of the critical load 102 may have to be walked into the bus 702 in accordance with a step load capability specification of the fuel cell system 116 or 118. Further, for instance, the fuel cell system 116 or 118 includes a standard quantity of ultra-capacitors such as SL5s which determine the step load capability of the fuel cell system 116 or 118. A maximum step load per 12.5 MW fuel cell system may be expected to be about 2500 kW for every 100 seconds, however, the step load capability may be increased further by adding more ultra-capacitor modules to the fuel cell system 116 or 118. In an embodiment, ultra-capacitors generally have a nameplate of maximum power and duration (kW-hr) they can be discharged for, this sets the step load capability. Further, in some embodiments, any energy storage device such as a battery or flywheel system could be used in place of an ultracapacitor system, without limiting the scope of the invention.

In some embodiments, the black start process is not needed when the fuel cell system 116 or 118 transitions from the grid-forming mode to the grid-following mode, because the grid 106 can typically energize the transformers and loads together instantaneously. However, the black start process is followed when the fuel cell system 116 or 118 transitions from the grid-following mode to the grid-forming mode.

The timing diagram 800 as depicted in FIG. 8A includes an X-axis representing time (T) in seconds and a Y-axis representing variation in power (P). Similarly, the timing diagram 850, as depicted in FIG. 8B, includes an X-axis representing time (T) in seconds and a Y-axis representing variation in power (P). However, the variation in power in FIG. 8A corresponds to that in the fuel cell system 116 or 118, and the variation in power in FIG. 8B corresponds to that in the ultracapacitors (SL5s). For the sake of simplicity, the power associated with the fuel cell system 116 or 118 may be referred to as fuel cell output (kilowatts) represented in FIG. 8A with a curve 802. Similarly, the power associated with the SL5s may be referred to as SL5 output represented with a curve 852. Thus, the load walk-in process is explained with the help of both FIGS. 8A and 8B, and steps in the load walk-in process are as follows:

1. Prior to time $T_1$, the fuel cell system 116 or 118 provides 100 percent (%) of load power $P_1$ so that an output of the ultra-capacitor (SL5 output) is 0 kW.
2. The critical load 102 or the portion 102A or 102B of the critical load 102 is instantaneously increased from level $P_1$ to level $P_2$ at time $T_1$. This walking-in of the load 102 or the portion 102A or 102B may be indicated as load step 1 as shown in FIG. 8A. The walking in of the load 102 or the portion 102A or 102B is represented in FIG. 8A as a curve 804.
3. The fuel cell system 116 or 118 ramps its output power from $P_1$ to $P_2$ in time $T_2$-$T_1$. During this ramp-up time, the difference between the critical load 102 and the fuel cell power is provided by a storage module such as the ultra-capacitor (e.g., SL5). The energy stored by the ultra-capacitor is represented by a curve 854 which shows that initially i.e., before time $T_1$, the ultra-capacitor stores the energy (in kilowatt-hour) corresponding to the power ($P_2$–$P_1$). However, during the ramp-up time, the ultra-capacitor discharges in a way as shown by the curves 852 and 854.
4. The fuel cell system 116 or 118 is ramped slightly above load level to charge the ultra-capacitor. The charging of the ultra-capacitor is shown in FIG. 8B by the curve 854 between time $T_2$ and $T_3$.
5. The ultra-capacitor completes the charging at $T_3$ and the system is ready to take the next step-up load.
6. The second set of loads is added at $T_4$ and the cycle repeats. The second step load is shown in FIG. 8A as load step 2.

The fuel cell systems 116 and 118 do not need any walk-out process and the critical load 102 is reduced to any level at any point in time.

Figure 9:
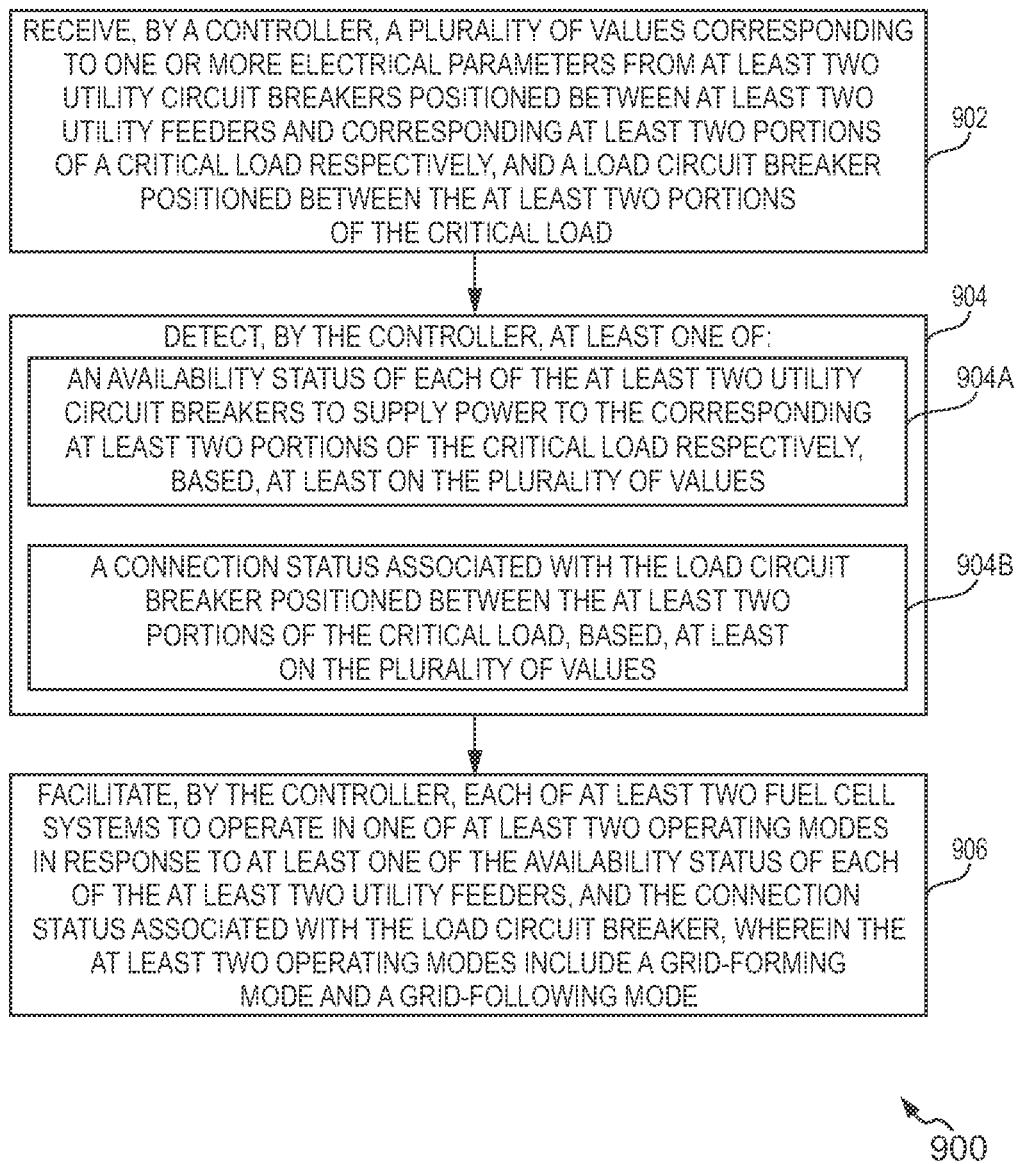
FIG. 9 is a flowchart illustrating a method for controlling one or more operating modes of one or more fuel cell systems connected to a critical load, in accordance with an embodiment of the present disclosure.

FIG. 9 is a flowchart illustrating a method 900 for controlling operating modes of one or more fuel cell systems connected to a critical load 102, in accordance with an embodiment of the present disclosure. The method 900 depicted in the flow diagram may be executed by, for example, the controller 120. Operations of the flow diagram of method 900, and combinations of operations in the flow diagram of method 900, may be implemented by, for example, hardware, firmware, a processor, circuitry, and/or a different device associated with the execution of software that includes one or more computer program instructions. The method 900 starts at operation 902.

At 902, the method 900 includes receiving, by a controller 120, a plurality of values corresponding to one or more electrical parameters from at least two utility circuit breakers (e.g., the utility circuit breakers 112 and 114) positioned between at least two utility feeders (e.g., the utility feeders 108 and 110) and corresponding to at least two portions (e.g., the portions 102A and 102B) of the critical load 102 respectively, and a load circuit breaker 104 positioned between the portions 102A and 102B of the critical load 102.

At 904, the method 900 includes steps 904a and 904b. At 904a, the method 900 includes detecting, by the controller 120, an availability status of each of the utility circuit breakers 112 and 114 to supply power to the corresponding portions 102A and 102B of the critical load 102 respectively, based at least on the plurality of values. At 904b, the method 900 includes detecting, by the controller 120, a connection status associated with the load circuit breaker 104 positioned between the portions 102A and 102B of the critical load 102, based at least on the plurality of values.

At 906, the method 900 includes facilitating, by the controller 120, each of at least two fuel cell systems (e.g., the fuel cell systems 116 and 118) to operate in one of at least two operating modes in response to at least one of the availability status of each of the utility feeders 108 and 110, and the connection status associated with the load circuit breaker 104. The at least two operating modes include a grid-forming mode and a grid-following mode.

The disclosed method 900 with reference to FIG. 9, or one or more operations of the method 900 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A system, comprising:
   at least two fuel cell systems comprising a first fuel cell system and a second fuel cell system, each of the at least two fuel cell systems configured to operate in one of at least two operating modes based on an operation of each of at least two utility feeders of a grid connected to the corresponding at least two fuel cell systems, the at least two operating modes comprising a grid-forming mode and a grid-following mode,
      wherein each of the at least two utility feeders is configured to supply power to a corresponding portion of at least two portions of a critical load through at least two utility circuit breakers, the at least two utility feeders comprising a first utility feeder and a second utility feeder, the at least two portions of the critical load comprising a first portion and a second portion,
      wherein the at least two portions of the critical load are connected through a load circuit breaker configured to control a flow of power through the at least two portions of the critical load; and
   a controller electronically coupled to each of the at least two fuel cell systems, the controller configured to:
      receive a plurality of values corresponding to one or more electrical parameters from the at least two utility circuit breakers and the load circuit breaker;
      detect at least one of:
         an availability status of each of the first utility feeder and the second utility feeder to supply power to the first portion and the second portion of the critical load respectively, based at least on the plurality of values; and
         a connection status associated with the load circuit breaker positioned between the first portion and the second portion of the critical load, based at least on the plurality of values; and
      facilitate each of the first fuel cell system and the second fuel cell system to operate in one of the at least two operating modes in response to at least one of the availability status of each of the first utility feeder and the second utility feeder, and the connection status associated with the load circuit breaker.

2. The system as claimed in claim 1, wherein the at least two fuel cell systems are configured to black start when transitioning from the grid-following mode to the grid-forming mode, wherein the black start is energized in a predefined sequence, the predefined sequence comprising a grid-forming phase and a load walk-in phase.

3. The system as claimed in claim 1, wherein the controller is further configured to facilitate the first fuel cell system and the second fuel cell system to operate in the grid-following mode, upon detecting that the availability status of the first utility feeder and the second utility feeder is 'available to supply power'.

4. The system as claimed in claim 1, wherein the controller is further configured to facilitate the first fuel cell system and the second fuel cell system to operate in the grid-forming mode independently, upon detecting that the availability status of the first utility feeder and the second utility feeder is 'unavailable to supply power', and the connection status associated with the load circuit breaker is 'disconnected'.

5. The system as claimed in claim 1, wherein the controller is further configured to facilitate the first fuel cell system and the second fuel system to operate in the grid-following mode, upon detecting that the availability status of the first utility feeder is 'unavailable to supply', the availability status of the second utility feeder is 'available to supply power', and the connection status associated with the load circuit breaker is 'connected'.

6. The system as claimed in claim 1, wherein the controller is further configured to facilitate the first fuel cell system to operate in the grid-forming mode, and the second fuel system in the grid-following mode, upon detecting that the availability status of the first utility feeder is 'unavailable to supply', the availability status of the second utility feeder is 'available to supply power', and the connection status associated with the load circuit breaker is 'disconnected'.

7. The system as claimed in claim 1, wherein the controller is further configured to facilitate the first fuel cell system and the second fuel system to operate in the grid-following mode, upon detecting that the availability status of the first utility feeder is 'available to supply', the availability status of the second utility feeder is 'unavailable to supply power', and the connection status associated with the load circuit breaker is 'connected'.

8. The system as claimed in claim 1, wherein the controller is further configured to facilitate the first fuel cell system to operate in the grid-following mode, and the second fuel system in the grid-forming mode, upon detecting that the availability status of the first utility feeder is 'available to supply', the availability status of the second utility feeder is 'unavailable to supply power', and the connection status associated with the load circuit breaker is 'disconnected'.

9. The system as claimed in claim 1, wherein the controller is further configured to:
receive a plurality of operating details corresponding to the critical load and a plurality of fuel cell-related details via a user device associated with a user;
generate a control signal based, at least in part, on a comparison of the plurality of operating details with the plurality of fuel cell-related details, the control signal comprising information instructing the load circuit breaker to open or close based on the comparison; and
facilitate the critical load to partition into the at least two portions by transmitting the control signal to the load circuit breaker when the control signal comprises information instructing the load circuit breaker to open.

10. The system as claimed in claim 9, wherein the plurality of operating details corresponding to the critical load comprises at least one of a type, operating power limits, operating voltage limits, operating current limits, and operating frequency limits.

11. The system as claimed in claim 9, wherein the plurality of fuel cell-related details comprises at least one of a storage capacity of each fuel cell system, a count of one or more fuel cell systems, a count of one or more inverters, and one or more electrical parameters corresponding to the one or more fuel cell systems.

12. The system as claimed in claim 1, wherein the controller is further configured to:
receive one or more operational parameters associated with the critical load as the critical load operates when each of the at least two fuel cell systems operates in one of the at least two operating modes;
identify one or more risks associated with the operation of the critical load based at least on the one or more operational parameters; and
generate one or more recommendations for optimizing the operation of the at least two fuel cell systems, based at least on historical data, the one or more recommendations corresponding to one or more countermeasures for addressing the one or more risks associated with the operation of the critical load.

13. The system as claimed in claim 1, wherein the controller is further configured to:
control an operation of an electrical interlocking device based, at least in part, on the availability status of each of the at least two utility feeders, wherein the electrical interlocking device is positioned between the at least fuel cell systems, wherein the at least fuel cell systems are configured to operate as a connected unit based, at least in part, on an operating status of the electrical interlocking device controlled by the controller.

14. A system, comprising:
at least two utility circuit breakers, each of the at least two circuit breakers are configured to control a flow of power from each of at least two utility feeders of a grid to corresponding at least two portions of a data center load, the at least two utility feeders comprising a first utility feeder and a second utility feeder, the at least two portions comprising a first portion and a second portion;
a load circuit breaker positioned between the at least two portions of the data center load, the load circuit breaker configured to control a flow of power through the at least two portions of the data center load,
wherein the first utility feeder and the first portion of the data center load are connected to a first fuel cell system configured to operate in one of at least two operating modes based on an operation of each of the at least two utility feeders of the grid,
wherein the second utility feeder and the second portion of the data center load are connected to a second fuel cell system configured to operate in one of the at least two operating modes based on the operation of each of the at least two utility feeders of the grid,
wherein the at least two operating modes comprise a grid-forming mode and a grid-following mode; and
a controller electronically coupled to the at least two utility circuit breakers and the load circuit breaker, the controller configured to:
receive a plurality of values corresponding to one or more electrical parameters from the at least two utility circuit breakers and the load circuit breaker;
detect at least one of:
an availability status of each of the first utility feeder and the second utility feeder to supply power to the first portion and the second portion of the data center load respectively, based at least on the plurality of values; and
a connection status associated with the load circuit breaker positioned between the first portion and the second portion of the data center load, based at least on the plurality of values; and
facilitate each of the first fuel cell system and the second fuel cell system to operate in one of the at least two operating modes in response to the at least one the availability status of each of the first utility feeder and the second utility feeder, and the connection status associated with the load circuit breaker.

15. A method, comprising:
receiving, by a controller, a plurality of values corresponding to one or more electrical parameters from at least two utility circuit breakers positioned between at least two utility feeders and corresponding at least two portions of a critical load respectively, and a load circuit breaker positioned between the at least two portions of the critical load;
detecting, by the controller, at least one of:
an availability status of each of the at least two utility circuit breakers to supply power to the corresponding at least two portions of the critical load respectively, based at least on the plurality of values; and
a connection status associated with the load circuit breaker positioned between the at least two portions of the critical load, based at least on the plurality of values; and
facilitating, by the controller, each of at least two fuel cell systems to operate in one of at least two operating modes in response to at least one of the availability status of each of the at least two utility feeders, and the connection status associated with the load circuit breaker, wherein the at least two operating modes include a grid-forming mode and a grid-following mode.

16. The method as claimed in claim 15, further comprising facilitating, by the controller, each of the at least two fuel cell systems to operate in the grid-following mode, upon detecting that the availability status of each of the at least two utility feeders is 'available to supply power', and independent of the connection status associated with the load circuit breaker.

17. The method as claimed in claim 15, further comprising facilitating, by the controller, each of the at least two fuel cell systems to operate in the grid-forming mode, upon detecting that the availability status of each of the at least two utility feeders is 'unavailable to supply power', and the connection status associated with the load circuit breaker in 'disconnected'.

18. The method as claimed in claim 15, further comprising facilitating, by the controller, each of the at least two fuel cell systems to operate in the grid-following mode, upon detecting that the availability status of a first utility feeder of the at least two utility feeders is 'unavailable to supply power', the availability status of a second utility feeder of the at least two utility feeders is 'available to supply power', and the connection status associated with the load circuit breaker is 'connected'.

19. The method as claimed in claim 15, further comprising facilitating, by the controller, a first fuel cell system of the at least two fuel cell systems to operate in the grid-forming mode, and a second fuel cell system of the at least two fuel cell systems to operate in the grid-following mode, upon detecting that the availability status of a first utility feeder of the at least two utility feeders is 'unavailable to supply power', the availability status of a second utility feeder of the at least two utility feeders is 'available to supply power', and the connection status associated with the load circuit breaker in 'disconnected'.

20. The method as claimed in claim 15, further comprising:
   receiving, by a controller, a plurality of operating details corresponding to the critical load and a plurality of fuel cell-related details via a user device associated with a user;
   generating, by the controller, a control signal based, at least in part, on a comparison of the plurality of operating details with the plurality of fuel cell-related details, the control signal comprising information instructing the load circuit breaker to open or close based on the comparison; and
   facilitating, by the controller, the critical load to partition into the at least two portions by transmitting the control signal to the load circuit breaker when the control.

* * * * *